(12) United States Patent
Kim et al.

(10) Patent No.: US 8,545,084 B2
(45) Date of Patent: Oct. 1, 2013

(54) LIGHT GUIDES AND BACKLIGHT SYSTEMS INCORPORATING LIGHT REDIRECTORS AT VARYING DENSITIES

(75) Inventors: Je Hong Kim, Lexington, MA (US); Jignesh Gandhi, Burlington, MA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 13/570,840

(22) Filed: Aug. 9, 2012

(65) Prior Publication Data

US 2012/0300497 A1    Nov. 29, 2012

Related U.S. Application Data

(63) Continuation of application No. 13/164,469, filed on Jun. 20, 2011, now Pat. No. 8,262,274, which is a continuation of application No. 11/973,187, filed on Oct. 5, 2007, now abandoned.

(60) Provisional application No. 60/853,409, filed on Oct. 20, 2006, provisional application No. 60/930,855, filed on May 18, 2007.

(51) Int. Cl.
*F21V 7/04* (2006.01)

(52) U.S. Cl.
USPC ........... 362/615; 362/620; 362/626; 362/617; 362/625; 349/65

(58) Field of Classification Search
USPC .............................. 362/615–629; 349/62, 69
See application file for complete search history.

(56) References Cited

U.S. PATENT DOCUMENTS

| | | |
|---|---|---|
| 4,067,043 A | 1/1978 | Perry |
| 4,074,253 A | 2/1978 | Nadir |
| 4,559,535 A | 12/1985 | Watkins et al. |
| 4,564,836 A | 1/1986 | Vuilleumier et al. |
| 4,582,396 A | 4/1986 | Bos et al. |
| 4,673,253 A | 6/1987 | Tanabe et al. |
| 4,744,640 A | 5/1988 | Phillips |
| 4,958,911 A | 9/1990 | Beiswenger et al. |
| 4,991,941 A | 2/1991 | Kalmanash |
| 5,005,108 A | 4/1991 | Pristash et al. |
| 5,042,900 A | 8/1991 | Parker |
| 5,050,946 A | 9/1991 | Hathaway et al. |
| 5,061,049 A | 10/1991 | Hornbeck |
| 5,062,689 A | 11/1991 | Koehler |
| 5,093,652 A | 3/1992 | Bull et al. |
| 5,096,279 A | 3/1992 | Hornbeck et al. |

(Continued)

FOREIGN PATENT DOCUMENTS

| | | |
|---|---|---|
| EP | 0 359 450 A2 | 3/1990 |
| EP | 0415625 A2 | 3/1991 |

(Continued)

OTHER PUBLICATIONS

"BLU," Heesung Precision Ltd., http://www.hspr.co.kr/eng/product/blu.asp Retrieved on Aug. 3, 2006.

(Continued)

*Primary Examiner* — Robert May
(74) *Attorney, Agent, or Firm* — Ropes & Gray LLP

(57) ABSTRACT

Light guides and backlight systems are disclosed that include one or more groups of geometric light redirectors whose arrangement and/or orientation across the surface of a light guide varies to improve light emission uniformity and to reduce visual artifacts.

20 Claims, 8 Drawing Sheets

(56) References Cited

U.S. PATENT DOCUMENTS

| | | |
|---|---|---|
| 5,128,787 A | 7/1992 | Blonder |
| 5,136,480 A | 8/1992 | Pristash et al. |
| 5,136,751 A | 8/1992 | Coyne et al. |
| 5,142,405 A | 8/1992 | Hornbeck |
| 5,198,730 A | 3/1993 | Vancil |
| 5,202,950 A | 4/1993 | Arego et al. |
| 5,233,385 A | 8/1993 | Sampsell |
| 5,233,459 A | 8/1993 | Bozler et al. |
| 5,278,652 A | 1/1994 | Urbanus et al. |
| 5,280,277 A | 1/1994 | Hornbeck |
| 5,319,491 A | 6/1994 | Selbrede |
| 5,339,116 A | 8/1994 | Urbanus et al. |
| 5,339,179 A | 8/1994 | Rudisill et al. |
| 5,359,345 A | 10/1994 | Hunter |
| 5,396,350 A | 3/1995 | Beeson et al. |
| 5,416,631 A | 5/1995 | Yagi |
| 5,440,197 A | 8/1995 | Gleckman |
| 5,452,024 A | 9/1995 | Sampsell |
| 5,461,411 A | 10/1995 | Florence et al. |
| 5,465,175 A | 11/1995 | Woodgate et al. |
| 5,467,104 A | 11/1995 | Furness, III et al. |
| 5,477,086 A | 12/1995 | Rostoker et al. |
| 5,479,279 A | 12/1995 | Barbier et al. |
| 5,493,439 A | 2/1996 | Engle |
| 5,497,172 A | 3/1996 | Doherty et al. |
| 5,504,389 A | 4/1996 | Dickey |
| 5,510,824 A | 4/1996 | Nelson |
| 5,519,565 A | 5/1996 | Kalt et al. |
| 5,523,803 A | 6/1996 | Urbanus et al. |
| 5,526,051 A | 6/1996 | Gove et al. |
| 5,528,262 A | 6/1996 | McDowall et al. |
| 5,548,301 A | 8/1996 | Kornher et al. |
| 5,559,389 A | 9/1996 | Spindt et al. |
| 5,568,964 A | 10/1996 | Parker et al. |
| 5,578,185 A | 11/1996 | Bergeron et al. |
| 5,579,035 A | 11/1996 | Beiswenger |
| 5,579,240 A | 11/1996 | Buus |
| 5,584,556 A | 12/1996 | Yokoyama et al. |
| 5,591,049 A | 1/1997 | Dohnishi |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,655,832 A | 8/1997 | Pelka et al. |
| 5,659,327 A | 8/1997 | Furness, III et al. |
| 5,666,226 A | 9/1997 | Ezra et al. |
| 5,684,354 A | 11/1997 | Gleckman |
| 5,724,062 A | 3/1998 | Hunter |
| 5,731,802 A | 3/1998 | Aras et al. |
| 5,745,193 A | 4/1998 | Urbanus et al. |
| 5,745,203 A | 4/1998 | Valliath et al. |
| 5,745,281 A | 4/1998 | Yi et al. |
| 5,771,321 A | 6/1998 | Stern |
| 5,781,331 A | 7/1998 | Carr et al. |
| 5,784,189 A | 7/1998 | Bozler et al. |
| 5,794,761 A | 8/1998 | Renaud et al. |
| 5,801,792 A | 9/1998 | Smith et al. |
| 5,835,255 A | 11/1998 | Miles |
| 5,835,256 A | 11/1998 | Huibers |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,990,990 A | 11/1999 | Crabtree |
| 6,008,781 A | 12/1999 | Furness, III et al. |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,055,090 A | 4/2000 | Miles |
| 6,068,382 A | 5/2000 | Fukui et al. |
| 6,079,838 A | 6/2000 | Parker et al. |
| 6,154,586 A | 11/2000 | MacDonald et al. |
| 6,158,867 A | 12/2000 | Parker et al. |
| 6,162,657 A | 12/2000 | Schiele et al. |
| 6,167,182 A | 12/2000 | Shinohara et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,195,195 B1 | 2/2001 | Chethik |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,296,383 B1 | 10/2001 | Henningsen |
| 6,300,154 B2 | 10/2001 | Clark et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,367,940 B1 | 4/2002 | Parker et al. |
| 6,379,016 B1 | 4/2002 | Boyd et al. |
| 6,388,661 B1 | 5/2002 | Richards |
| 6,402,335 B1 | 6/2002 | Kalantar et al. |
| 6,404,942 B1 | 6/2002 | Edwards et al. |
| 6,424,329 B1 | 7/2002 | Okita |
| 6,429,625 B1 | 8/2002 | LeFevre et al. |
| 6,454,452 B1 | 9/2002 | Sasagawa et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,485,157 B2 | 11/2002 | Ohkawa |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,523,961 B2 | 2/2003 | Ilkov et al. |
| 6,529,265 B1 | 3/2003 | Henningsen |
| 6,531,947 B1 | 3/2003 | Weaver et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Watson et al. |
| 6,582,095 B1 | 6/2003 | Toyoda |
| 6,583,915 B1 | 6/2003 | Hong et al. |
| 6,589,625 B1 | 7/2003 | Kothari et al. |
| 6,591,049 B2 | 7/2003 | Williams et al. |
| 6,600,474 B1 | 7/2003 | Heines et al. |
| 6,633,301 B1 | 10/2003 | Dallas et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,671,078 B2 | 12/2003 | Flanders et al. |
| 6,674,562 B1 | 1/2004 | Miles |
| 6,677,709 B1 | 1/2004 | Ma et al. |
| 6,678,021 B2 | 1/2004 | Ohkawa |
| 6,680,792 B2 | 1/2004 | Miles |
| 6,687,896 B1 | 2/2004 | Royce et al. |
| 6,690,422 B1 | 2/2004 | Daly et al. |

| Patent No. | Date | Inventor(s) |
|---|---|---|
| 6,701,039 B2 | 3/2004 | Bourgeois et al. |
| 6,707,176 B1 | 3/2004 | Rodgers |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,547 B2 | 6/2004 | Parker |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,809,851 B1 | 10/2004 | Gurcan |
| 6,819,465 B2 | 11/2004 | Clikeman et al. |
| 6,825,470 B1 | 11/2004 | Bawolek et al. |
| 6,827,456 B2 | 12/2004 | Parker et al. |
| 6,831,678 B1 | 12/2004 | Travis |
| 6,835,111 B2 | 12/2004 | Ahn et al. |
| 6,846,082 B2 | 1/2005 | Glent-Madsen et al. |
| 6,847,425 B2 | 1/2005 | Tanada et al. |
| 6,852,095 B1 | 2/2005 | Ray |
| 6,857,751 B2 | 2/2005 | Penn et al. |
| 6,859,625 B2 | 2/2005 | Sawada |
| 6,863,219 B1 | 3/2005 | Jacobsen et al. |
| 6,864,618 B2 | 3/2005 | Miller et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Yamada et al. |
| 6,897,164 B2 | 5/2005 | Baude et al. |
| 6,900,072 B2 | 5/2005 | Patel et al. |
| 6,906,847 B2 | 6/2005 | Huibers et al. |
| 6,908,204 B2 | 6/2005 | Kraft |
| 6,911,891 B2 | 6/2005 | Qiu et al. |
| 6,911,964 B2 | 6/2005 | Lee et al. |
| 6,919,981 B2 | 7/2005 | Clikeman et al. |
| 6,934,080 B2 | 8/2005 | Saccomanno et al. |
| 6,936,968 B2 | 8/2005 | Cross et al. |
| 6,939,013 B2 | 9/2005 | Asao |
| 6,940,631 B2 | 9/2005 | Ishikawa |
| 6,947,107 B2 | 9/2005 | Yoshii et al. |
| 6,953,375 B2 | 10/2005 | Ahn et al. |
| 6,961,167 B2 | 11/2005 | Prins et al. |
| 6,962,419 B2 | 11/2005 | Huibers |
| 6,965,375 B1 | 11/2005 | Gettemy et al. |
| 6,967,698 B2 | 11/2005 | Tanoue et al. |
| 6,969,635 B2 | 11/2005 | Patel et al. |
| 6,970,227 B2 | 11/2005 | Kida et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,042,618 B2 | 5/2006 | Selbrede et al. |
| 7,042,643 B2 | 5/2006 | Miles |
| 7,046,221 B1 | 5/2006 | Malzbender |
| 7,046,905 B1 | 5/2006 | Gardiner et al. |
| 7,050,035 B2 | 5/2006 | Iisaka et al. |
| 7,050,141 B2 | 5/2006 | Yokoue |
| 7,050,219 B2 | 5/2006 | Kimura |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,110,158 B2 | 9/2006 | Miles |
| 7,116,464 B2 | 10/2006 | Osawa |
| 7,123,216 B1 | 10/2006 | Miles |
| 7,123,796 B2 | 10/2006 | Steckl et al. |
| 7,126,738 B2 | 10/2006 | Miles |
| 7,161,094 B2 | 1/2007 | Kothari et al. |
| 7,164,250 B2 | 1/2007 | Boscolo et al. |
| 7,184,202 B2 | 2/2007 | Miles et al. |
| 7,198,982 B2 | 4/2007 | Patel et al. |
| 7,227,677 B2 | 6/2007 | Ravnkilde et al. |
| 7,271,945 B2 | 9/2007 | Hagood et al. |
| 7,274,416 B2 | 9/2007 | Feenstra et al. |
| 7,304,785 B2 | 12/2007 | Hagood et al. |
| 7,304,786 B2 | 12/2007 | Hagood et al. |
| 7,463,227 B2 | 12/2008 | Van Gorkom |
| 7,619,806 B2 | 11/2009 | Hagood, IV et al. |
| 7,876,489 B2 | 1/2011 | Gandhi et al. |
| 8,262,274 B2 | 9/2012 | Kim et al. |
| 2001/0001260 A1 | 5/2001 | Parker et al. |
| 2001/0028993 A1 | 10/2001 | Sanford |
| 2001/0040538 A1 | 11/2001 | Quanrud |
| 2001/0043208 A1 | 11/2001 | Furness, III et al. |
| 2001/0053075 A1 | 12/2001 | Parker et al. |
| 2002/0001051 A1 | 1/2002 | Krusius et al. |
| 2002/0009275 A1 | 1/2002 | Williams et al. |
| 2002/0015215 A1 | 2/2002 | Miles |
| 2002/0024641 A1 | 2/2002 | Ilkov et al. |
| 2002/0024711 A1 | 2/2002 | Miles |
| 2002/0047172 A1 | 4/2002 | Reid |
| 2002/0054424 A1 | 5/2002 | Miles |
| 2002/0054487 A1 | 5/2002 | Parker et al. |
| 2002/0054488 A1 | 5/2002 | Ohkawa |
| 2002/0056900 A1 | 5/2002 | Liu et al. |
| 2002/0063661 A1 | 5/2002 | Comiskey et al. |
| 2002/0070931 A1 | 6/2002 | Ishikawa |
| 2002/0075555 A1 | 6/2002 | Miles |
| 2002/0080598 A1 | 6/2002 | Parker et al. |
| 2002/0126364 A1 | 9/2002 | Miles |
| 2002/0126387 A1 | 9/2002 | Ishikawa et al. |
| 2002/0132389 A1 | 9/2002 | Patel et al. |
| 2002/0141174 A1 | 10/2002 | Parker et al. |
| 2002/0149828 A1 | 10/2002 | Miles et al. |
| 2002/0163482 A1 | 11/2002 | Sullivan |
| 2002/0163484 A1 | 11/2002 | Furness, III et al. |
| 2002/0171327 A1 | 11/2002 | Miller et al. |
| 2002/0185699 A1 | 12/2002 | Reid |
| 2002/0196522 A1 | 12/2002 | Little et al. |
| 2003/0007344 A1 | 1/2003 | Parker |
| 2003/0009898 A1 | 1/2003 | Slocum et al. |
| 2003/0023110 A1 | 1/2003 | Tam et al. |
| 2003/0029705 A1 | 2/2003 | Qiu et al. |
| 2003/0036215 A1 | 2/2003 | Reid |
| 2003/0043157 A1 | 3/2003 | Miles |
| 2003/0048036 A1 | 3/2003 | Lemkin |
| 2003/0058543 A1 | 3/2003 | Sheedy et al. |
| 2003/0063233 A1 | 4/2003 | Takagi |
| 2003/0063234 A1 | 4/2003 | Oda et al. |
| 2003/0076649 A1 | 4/2003 | Speakman |
| 2003/0081402 A1 | 5/2003 | Jeon et al. |
| 2003/0085650 A1 | 5/2003 | Cathey et al. |
| 2003/0085867 A1 | 5/2003 | Grabert |
| 2003/0095081 A1 | 5/2003 | Furness, III et al. |
| 2003/0095398 A1 | 5/2003 | Parker et al. |
| 2003/0102810 A1 | 6/2003 | Cross et al. |
| 2003/0123245 A1 | 7/2003 | Parker et al. |
| 2003/0123246 A1 | 7/2003 | Parker |
| 2003/0123247 A1 | 7/2003 | Parker et al. |
| 2003/0133284 A1 | 7/2003 | Chipchase et al. |
| 2003/0137499 A1 | 7/2003 | Iisaka |
| 2003/0152872 A1 | 8/2003 | Miles |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190535 A1 | 10/2003 | Fries |
| 2003/0190536 A1 | 10/2003 | Fries |

| | | | | | | |
|---|---|---|---|---|---|---|
| 2003/0202338 A1 | 10/2003 | Parker | | 2005/0213322 A1 | 9/2005 | Parker |
| 2003/0231160 A1 | 12/2003 | Yoshihara et al. | | 2005/0213323 A1 | 9/2005 | Parker |
| 2004/0012946 A1 | 1/2004 | Parker et al. | | 2005/0213349 A1 | 9/2005 | Parker |
| 2004/0027636 A1 | 2/2004 | Miles | | 2005/0219679 A1 | 10/2005 | Ishikawa |
| 2004/0051929 A1 | 3/2004 | Sampsell et al. | | 2005/0219680 A1 | 10/2005 | Ishikawa |
| 2004/0058532 A1 | 3/2004 | Miles et al. | | 2005/0225501 A1 | 10/2005 | Srinivasan et al. |
| 2004/0080240 A1 | 4/2004 | Miller et al. | | 2005/0225519 A1 | 10/2005 | Naugler, Jr. |
| 2004/0080484 A1 | 4/2004 | Heines et al. | | 2005/0225732 A1 | 10/2005 | Conner et al. |
| 2004/0080927 A1 | 4/2004 | Parker et al. | | 2005/0225827 A1 | 10/2005 | Kastalsky |
| 2004/0085749 A1 | 5/2004 | Parker et al. | | 2005/0231790 A1 | 10/2005 | Miles |
| 2004/0090144 A1 | 5/2004 | Miller et al. | | 2005/0237596 A1 | 10/2005 | Selbrede |
| 2004/0095739 A1 | 5/2004 | Parker et al. | | 2005/0242710 A1 | 11/2005 | Yamazaki et al. |
| 2004/0100677 A1 | 5/2004 | Huibers et al. | | 2005/0243023 A1 | 11/2005 | Reddy et al. |
| 2004/0114346 A1 | 6/2004 | Parker et al. | | 2005/0244099 A1 | 11/2005 | Pasch et al. |
| 2004/0122328 A1 | 6/2004 | Wang et al. | | 2005/0244949 A1 | 11/2005 | Miles |
| 2004/0125346 A1 | 7/2004 | Huibers | | 2005/0245313 A1 | 11/2005 | Yoshino et al. |
| 2004/0135273 A1 | 7/2004 | Parker et al. | | 2005/0247477 A1 | 11/2005 | Kothari et al. |
| 2004/0135951 A1 | 7/2004 | Stumbo et al. | | 2005/0249966 A1 | 11/2005 | Tung et al. |
| 2004/0136204 A1 | 7/2004 | Asao | | 2005/0253779 A1 | 11/2005 | Feenstra et al. |
| 2004/0145580 A1 | 7/2004 | Perlman | | 2005/0254115 A1 | 11/2005 | Palmateer et al. |
| 2004/0157664 A1 | 8/2004 | Link | | 2005/0258571 A1 | 11/2005 | Dumond et al. |
| 2004/0165372 A1 | 8/2004 | Parker | | 2005/0259198 A1 | 11/2005 | Lubart et al. |
| 2004/0171206 A1 | 9/2004 | Rodgers | | 2005/0265029 A1 | 12/2005 | Epstein et al. |
| 2004/0179146 A1 | 9/2004 | Nilsson | | 2005/0281052 A1 | 12/2005 | Teng et al. |
| 2004/0196215 A1 | 10/2004 | Duthaler et al. | | 2005/0285816 A1 | 12/2005 | Glass |
| 2004/0196646 A1 | 10/2004 | Machi et al. | | 2005/0286113 A1 | 12/2005 | Miles |
| 2004/0207768 A1 | 10/2004 | Liu | | 2005/0286114 A1 | 12/2005 | Miles |
| 2004/0218149 A1 | 11/2004 | Huibers | | 2006/0001942 A1 | 1/2006 | Chui et al. |
| 2004/0218154 A1 | 11/2004 | Huibers | | 2006/0020676 A1 | 1/2006 | Peterson et al. |
| 2004/0218292 A1 | 11/2004 | Huibers | | 2006/0028708 A1 | 2/2006 | Miles |
| 2004/0218293 A1 | 11/2004 | Huibers | | 2006/0028811 A1 | 2/2006 | Ross et al. |
| 2004/0223088 A1 | 11/2004 | Huibers | | 2006/0028817 A1 | 2/2006 | Parker |
| 2004/0223240 A1 | 11/2004 | Huibers | | 2006/0028840 A1 | 2/2006 | Parker |
| 2004/0227428 A1 | 11/2004 | Sinclair | | 2006/0028841 A1 | 2/2006 | Parker |
| 2004/0233392 A1 | 11/2004 | Huibers | | 2006/0028843 A1 | 2/2006 | Parker |
| 2004/0240032 A1 | 12/2004 | Miles | | 2006/0028844 A1 | 2/2006 | Parker |
| 2004/0246275 A1 | 12/2004 | Yoshihara et al. | | 2006/0033975 A1 | 2/2006 | Miles |
| 2004/0263502 A1 | 12/2004 | Dallas et al. | | 2006/0044246 A1 | 3/2006 | Mignard |
| 2004/0263944 A1 | 12/2004 | Miles et al. | | 2006/0044298 A1 | 3/2006 | Mignard et al. |
| 2005/0002082 A1 | 1/2005 | Miles | | 2006/0044928 A1 | 3/2006 | Chui et al. |
| 2005/0002086 A1 | 1/2005 | Starkweather et al. | | 2006/0061559 A1 | 3/2006 | King |
| 2005/0007759 A1 | 1/2005 | Parker | | 2006/0066934 A1 | 3/2006 | Selbrede |
| 2005/0024849 A1 | 2/2005 | Parker et al. | | 2006/0066937 A1 | 3/2006 | Chui |
| 2005/0030827 A1 | 2/2005 | Gilliland et al. | | 2006/0077125 A1 | 4/2006 | Floyd |
| 2005/0031412 A1 | 2/2005 | Loader | | 2006/0077153 A1 | 4/2006 | Cummings et al. |
| 2005/0059184 A1 | 3/2005 | Sniegowski et al. | | 2006/0077533 A1 | 4/2006 | Miles et al. |
| 2005/0062708 A1 | 3/2005 | Yoshihara et al. | | 2006/0092490 A1 | 5/2006 | McCollum et al. |
| 2005/0063037 A1 | 3/2005 | Selebrede et al. | | 2006/0132383 A1 | 6/2006 | Gally et al. |
| 2005/0072032 A1 | 4/2005 | McCollum et al. | | 2006/0132404 A1 | 6/2006 | Hayes et al. |
| 2005/0073471 A1 | 4/2005 | Selbrede | | 2006/0139734 A1 | 6/2006 | Selebrede et al. |
| 2005/0088404 A1 | 4/2005 | Heines et al. | | 2006/0146389 A1 | 7/2006 | Selbrede |
| 2005/0093465 A1 | 5/2005 | Yonekubo et al. | | 2006/0172745 A1 | 8/2006 | Knowles |
| 2005/0094240 A1 | 5/2005 | Huibers et al. | | 2006/0187190 A1 | 8/2006 | Hagood et al. |
| 2005/0094418 A1 | 5/2005 | Parker | | 2006/0187191 A1 | 8/2006 | Hagood et al. |
| 2005/0104804 A1 | 5/2005 | Feenstra et al. | | 2006/0187528 A1 | 8/2006 | Hagood et al. |
| 2005/0111238 A1 | 5/2005 | Parker | | 2006/0238443 A1 | 10/2006 | Derichs |
| 2005/0111241 A1 | 5/2005 | Parker | | 2006/0250325 A1 | 11/2006 | Hagood et al. |
| 2005/0116798 A1 | 6/2005 | Bintoro et al. | | 2006/0250676 A1 | 11/2006 | Hagood |
| 2005/0122560 A1 | 6/2005 | Sampsell et al. | | 2006/0256039 A1 | 11/2006 | Hagood et al. |
| 2005/0122591 A1 | 6/2005 | Parker et al. | | 2006/0262060 A1 | 11/2006 | Amundson |
| 2005/0123243 A1 | 6/2005 | Steckl et al. | | 2006/0262380 A1 | 11/2006 | Miles |
| 2005/0128370 A1 | 6/2005 | Moon | | 2006/0268386 A1 | 11/2006 | Selbrede et al. |
| 2005/0134805 A1 | 6/2005 | Conner et al. | | 2006/0270179 A1 | 11/2006 | Yang |
| 2005/0141076 A1 | 6/2005 | Bausenwein et al. | | 2006/0291034 A1 | 12/2006 | Patry et al. |
| 2005/0151940 A1 | 7/2005 | Asao | | 2007/0002156 A1 | 1/2007 | Hagood et al. |
| 2005/0157365 A1 | 7/2005 | Ravnkilde et al. | | 2007/0002413 A1 | 1/2007 | Psaltis et al. |
| 2005/0157376 A1 | 7/2005 | Huibers et al. | | 2007/0030555 A1 | 2/2007 | Barton et al. |
| 2005/0168431 A1 | 8/2005 | Chui | | 2007/0031097 A1 | 2/2007 | Heikenfeld et al. |
| 2005/0168789 A1 | 8/2005 | Glent-Madsen | | 2007/0035808 A1 | 2/2007 | Amundson et al. |
| 2005/0171408 A1 | 8/2005 | Parker | | 2007/0040982 A1 | 2/2007 | Nakano et al. |
| 2005/0179977 A1 | 8/2005 | Chui et al. | | 2007/0047051 A1 | 3/2007 | Selbrede et al. |
| 2005/0195467 A1 | 9/2005 | Kothari et al. | | 2007/0047887 A1 | 3/2007 | Selbrede |
| 2005/0195468 A1 | 9/2005 | Sampsell | | 2007/0052660 A1 | 3/2007 | Montbach et al. |
| 2005/0206991 A1 | 9/2005 | Chui et al. | | 2007/0053652 A1 | 3/2007 | Mignard et al. |
| 2005/0207154 A1 | 9/2005 | Parker | | 2007/0086078 A1 | 4/2007 | Hagood et al. |
| 2005/0207178 A1 | 9/2005 | Parker | | 2007/0091011 A1 | 4/2007 | Selbrede |
| 2005/0212738 A1 | 9/2005 | Gally | | 2007/0091038 A1 | 4/2007 | Hagood et al. |
| 2005/0213182 A1 | 9/2005 | Cossairt et al. | | 2007/0150813 A1 | 6/2007 | Selebrede et al. |
| 2005/0213183 A9 | 9/2005 | Miles | | 2007/0159679 A1 | 7/2007 | Hagood et al. |

| | | | |
|---|---|---|---|
| 2007/0172171 A1 | 7/2007 | Van Ostrand et al. | |
| 2007/0195026 A1 | 8/2007 | Hagood et al. | |
| 2007/0205969 A1 | 9/2007 | Hagood et al. | |
| 2007/0216987 A1 | 9/2007 | Hagood et al. | |
| 2007/0223080 A1 | 9/2007 | Hagood et al. | |
| 2008/0030827 A1 | 2/2008 | Hagood et al. | |
| 2008/0037104 A1 | 2/2008 | Hagood et al. | |
| 2008/0094853 A1 | 4/2008 | Kim et al. | |
| 2008/0123175 A1 | 5/2008 | Hagood et al. | |
| 2008/0129681 A1 | 6/2008 | Hagood et al. | |
| 2008/0145527 A1 | 6/2008 | Hagood et al. | |
| 2008/0174532 A1 | 7/2008 | Lewis | |
| 2008/0278798 A1 | 11/2008 | Hagood et al. | |
| 2008/0279727 A1 | 11/2008 | Haushalter | |
| 2008/0283175 A1 | 11/2008 | Hagood et al. | |
| 2009/0103164 A1 | 4/2009 | Fijol et al. | |

FOREIGN PATENT DOCUMENTS

| | | |
|---|---|---|
| EP | 0 495 273 A1 | 7/1992 |
| EP | 0 751 340 A2 | 1/1997 |
| EP | 757958 A1 | 2/1997 |
| EP | 0 884 525 A2 | 12/1998 |
| EP | 1 091 342 A2 | 4/2001 |
| EP | 1 202 096 | 5/2002 |
| EP | 1329664 A1 | 7/2003 |
| EP | 1 426 190 A1 | 6/2004 |
| EP | 1 533 853 A2 | 5/2005 |
| EP | 1 674 893 A1 | 6/2006 |
| EP | 1757958 A1 | 2/2007 |
| FR | 2 726 135 | 10/1994 |
| JP | 03-142409 | 6/1991 |
| JP | 04-249203 | 9/1992 |
| JP | 09-198906 | 7/1997 |
| JP | 11-015393 | 1/1999 |
| JP | 2002318564 A | 10/2002 |
| JP | 2003-162904 | 6/2003 |
| JP | 2003208810 A | 7/2003 |
| WO | WO-9401716 A1 | 1/1994 |
| WO | WO-98/04950 | 2/1998 |
| WO | WO-98/55798 A2 | 12/1998 |
| WO | WO-9901696 A1 | 1/1999 |
| WO | WO-0050807 A1 | 8/2000 |
| WO | WO-03008860 A1 | 1/2003 |
| WO | WO-03050448 A1 | 6/2003 |
| WO | WO-03061329 A2 | 7/2003 |
| WO | WO-2004019120 A1 | 3/2004 |
| WO | WO-2004034136 A1 | 4/2004 |
| WO | WO-2004086098 A2 | 10/2004 |
| WO | WO-2005001892 A2 | 1/2005 |
| WO | WO-2005062908 A2 | 7/2005 |
| WO | WO-2006/017129 A2 | 2/2006 |
| WO | WO-2006023077 A2 | 3/2006 |
| WO | WO-2006039315 A2 | 4/2006 |
| WO | WO-2006052755 A2 | 5/2006 |
| WO | WO-2007123173 A1 | 11/2007 |
| WO | WO-2007145973 A2 | 12/2007 |

OTHER PUBLICATIONS

"Electronic Display Lighting Tutorials," 3M Corporation, file?//D:/Optical\Vikuiti Tutorial.htm., retrieved on Aug. 10, 2006.
"MicroLens™—Re-Inventing LCD Backlighting," Global Lighting Technologies Inc., http://www.glthome.com/tech.htm, 1-2.
"Microprism Technology for Luminaires," Reflexite Display Optics.
"Nano™ Su-8 2000 Negative Tone Photoresist Formulations 2002-2025," Micro Chem.
"Optical Design Tools for Backlight Displays," Light Tools, Optical Research Associates, 1-8.
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378DOHGJgl/theme_us_vikuiti_3_0/command_AbcPageHandler/output_html Retrieved on Aug. 3, 2006.
"Prism Sheet," Mitsubishi Rayon America Inc., http://www.mrany.com/data/HTML/29.htm Retrieved on Aug. 4, 2006.
"Two Proprietary Technologies Supporting OMRON Backlight," OMRON Electronics Corporation, OMRON Electronics Components Web, www.omron.co.jp/ecb/products/bklight/english/genri/index.html.
Akimoto et al, "15.1: A 0.9—in UXGA/HDTV FLC Microdisplay," SID 00 Digest, 194-197(2000).
Alt et al, "A Gray-Scale Addressing Technique for Thin-Film-Transistor/Liquid Crystal Displays," IBM J. Res. Develop., 36(1):11-22(Jan. 1992).
AZ Displays, Inc. Complete LCD Solutions, ATM3224C-NC-FTH.
Bergquist et. al. "Field Sequential Colour Display with Adaptive Gamut", Society for Information Display, Digest of Technical Papers 2006, p. 1594.
Birch et al, "31.1: SXGA Resolution FLC Microdisplays," SID 02 Digest, 954-957(2002).
Blackstone, "Making MEMS Reliable," SPIE's OEMagazine, 32-34(Sep. 2002).
Boeuf, "Plasma display panels: physics, recent developments and key issues," J. Phys. D: Appl, Phys., 36:R53-R79(2003).
Bozler et al, "Arrays of gated field-emitter cones having 0.32 m tip-to-tip spacing," J. Vec. Sci. Technol. B, 12(2):629-632(Mar./Apr. 1994).
Bryan-Brown, "Ultra Low Poer Bistable LCDs," SID 00, 76-79(2000).
Chino et. al. "Development of Wide-Color-Gamut Mobile Displays with Four-Primary-Color LCDs", Society of Information Display, Digest of Technical Papers 2006, p. 1221.
Clark et al, "FLC Microdisplays," Ferroelectrics, 246:97-110(2000).
Doherty et. al. "Pulse Width Modulation Control of DLP Projectors", TI Technical Journal 1998, No. 3, p. 115.
Davis, "Light Emitting Diode Source Modeling for Optical Design," Reflexite Display Optics(Oct. 2004).
Davis, "Microstructured Optics for LED Applications," Reflexite Display Optics.
den Boer, "Active Matrix Liquid Crystal Displays," Elsevier Science & Technology Books, ISBN #0750678135, Aug. 2005.
Doane, et al, "Display Technologies in Russia, Ukraine, and Belarus," World Technology Evaluation Center Panel Report (Dec. 1994).
Saeedi, et. al. "Molten-Alloy Driven Self-Assembly for Nano and Micro Scale System Integration" Fluid Dynamics and Materials Processing v. 2, p. 221 (2006).
Feenstra et al, "Electrowetting Displays," Liquavista BV, http://www.liquavista.com/documents/electrowetting_displays_whitepaper.pdf, Retrieved on Aug. 17, 2006.
Feenstra et. al. "A Reflective Display Based on Electrowetting: Principle and Properties", International Display Research Conference Proceedings 2003, p. 322.
Feng et al, "Novel integrated light-guide plates for liquid crystal display backlight," J. Opt. A: Pure Appl. Opt., 7:111-117(2005).
Feng, "High Quality Light Guide Plates that Can Control the Illumination Angle Based on Microprism Structures," Applied Physics Letters, 85(24):6016-6018(Dec. 2004).
Final Office Action dated May 18, 2007, U.S. Appl. No. 11/218,690.
Final Office Action dated Sep. 21, 2007, U.S. Appl. No. 11/546,937.
Final Office ActionDated Oct. 3, 2007, U.S. Appl. No. 11/218,690.
Foley, "NE04-21: Microstructured Plastic Optics for Display, Lighting, and Telecommunications Applications," Fresnel Optics(2001).
Funamoto et al, "Diffusive-sheetless Backlight System for Mobile Phone," IDW/AD, 1277-1280(2005).
Funamoto et. al. "LED Backlight System with Double-Prism Pattern", Journal of the Society for Information Display v. 14, p. 1045 (2006).
Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).
Hartman, "4.1: Invited paper: Two-Terminal Devices Technologies for AMLCDs," SID 95 Digest, 7-10(1995).
Hewlett et al, "DLP Cinema™ projection: A hybrid frame-rate technique for flicker-free performance," Journ of the SID 9/3, 221-226(2001).
Hornbeck, "Digital Light Processing™: A New MEMS-Based Display Technology," Texas Instruments.

International Search Report in International Application No. PCT/US2009/002288 dated Jul. 21,2009.

International Search Report, Application No. PCTUS2007021434 dated Feb. 28, 2008.

J. Heikenfeld et. al., "Contrast Enhancement in Black Dielectric Electroluminescent Devices", IEEE Transactions on Electron Devices, v. 49, p. 1348 (2002).

Jepsen et al, "4.11: 0.9" SXGA Liquid Crystal on Silicon Panel with 450 Hz. Field Rate," MicroDisplay Coropration, 106-109.

Johnstone et al, "Theoretical limits on the freestanding length of cantilevers produced by surface micromachining technology," J. Micromech. Microeng. 12:855-861(2002).

Jones et al, "29-1: Addressing Vmin Ferroelectric Liquid Crystal Displays," (1998).

Judy, M. W. "Micromechanisms Using Sidewall Beams" (1994).

K-C Lee et. al. "Integrated Amorphous Silicon Color Sensor on LCD Panel for LED Backlight Feedback Control System", Society for Information Display, Digest of Technical Papers 2005, p. 1376.

Kalantar et al, "Optical Micro Deflector Based Functional Light-Guide Plate for Backlight Unit," SID 00 Digest, 1029-1031(2000).

Kalantar, "Modulation of viewing angle on an LCD surface through backlight optics," Journal of the SID, 11(4):647-652(2003).

Koden et al, "Ferroelectric Liquid Crystal Display," (Sep. 17, 1997).

Kuang et al, "Dynamic Characteristics of shaped micro-actuators solved using the differential quadrature method," J. Micromech. Microeng. 14:647-655(2004).

Kunzman and G. Pettitt, "White Enhancement for Color Sequential DLP" Society for Information Display, Digest of Technical Papers 1998.

Lee et al, "P-25: A LCOS Microdisplay Driver with Frame Buffering Pixels," SID 02 Digest, 292-295(2002).

Legtenberg et al, "Electrostatic Curved Electrode Actuators," Journal of Microelectromechanical Systems, 6:3(257-265)(Sep. 1997).

Li et al, "Drie-Fabricated Curved-Electrode Zipping Actuators with Low Pull-In Voltage," IEE, 480-483 (2003).

Liang et al, "Observation of electric field gradients near field-emission cathode arrays," Appl Phys. Lett., 66(9):1147-1149(Feb. 1995).

Liu et al, "Scaling Laws of Microactuators and Potential Applications of Electroactive Polymers in MEMS," SPIE, 3669:345-354(Mar. 1999).

Low-Temperature Polysilicon TFT Reflective Color LCD by Techno World.

Maboudian et al, "Stiction reduction processes for surface micromachines," Tribology Letters, 3:215-221(1997).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

McLaughlin, "Progress in Projection and Large-Area Displays," Proceedings of the IEEE, 90(4):521-532(Apr. 2002).

Non-Final Office Action dated Mar. 22, 2007, U.S. Appl. No. 11/546,937.

Non-Final Office Action dated Nov. 1, 2006, U.S. Appl. No. 11/218,690.

Okumura et al, "Highly-efficient backlight for liquid crystal display having no. optical films," Applied Physics Letters, 83(13):2515-2517(Sep. 2003).

Perregaux et al, "Arrays of Addressable High-Speed Optical Microshutters," IEEE, 232-235, (2001).

Q. Tan and Y.C. Lee, "Soldering Technology for Optoelectronics Packaging", 1996 Electronic Components and Technology Conference, p. 26.

Qiu et al, "A Curved-Beam Bistable Mechanism," Journal of Microelectromechanical Systems, 13(2):137-145(Apr. 2004).

Qui et al, "A High-Current Electrothermal Bistable MEMS Relay,".

Ravnkilde et al, "Fabrication of Nickel Microshutter Arrays for Spatial Light Modulation" Meso 2002, also on their web site: http://www2.mic.dtu.dk/research/mems/publications/Papers/Dicon_Meso2002.pdf (2002).

Roosendaal et al, "25.2: A Wide Gamut, High Aperture Mobile Spectrum Sequential Liquid Crystal Display," SID 05 Digest, 1116-1119(2005).

S. Pasricha et. al. "Dynamic Backlight Adaptation for Low Power Handheld Devices" IEEE Design and Test v. 21, p. 398 (2004).

Sato, "Research on Flexible Display Systems," Broadcast Technology, 21:10-15(2005).

Sharp Specification No. LCP-03015 for Mobile Liquid Crystal Display Group, Sharp Corporation, Jun. 13, 2003.

Shibaura Mechatronics Corporation, product brochure for panel processing.

Shikida et al, "Fabrication fo an S-shaped Microactuator," Journal of Microelectromechanical Systems, 6(1):18-24(Mar. 1997).

Sony ACX705AKM, 6.92cm Diagonal Reflective Color LCD Module.

Steyn, Lodewyck, "Electroquasistatic Zipper Actuators: A Technology Review", Dec. 2004.

T. van de Biggelaar, et. al. "Passive and Active Matrix Addressed Polymer Light-emitting Diode Displays", Proc. SPIE vol. 4295, p. 134 (2001).

Tagaya et al, "Thin Liquid-Crystal Display Backlight System with Highly Scattering Optical Transmission Polymers," Applied Optics, 40(34):6274-6280(Dec. 2001).

Takatori et al, "6.3: Field-Sequential Smectic LCD with TFT Pixel Amplifier," SID 01 Digest, 48-51(2001).

Teijido, J.M., "Conception and Design of Illumination Light Pipes," Thesis No. 1498 for University of Neuchatel, http://www.unige.ch/cyberdocuments/unine/theses2000/TeijidoJM/these_front.htm l:1-99 Retrieved on Aug. 3, 2006.

Tien et al, "MEMS Actuators for Silicon Micro-Optical Elements," Proc. of SPIE, 4178:256-269, (2000).

Underwood, "A review of microdisplay technologies," SID@EID, (Nov. 21-23, 2000).

Underwood, "LCoS through the looking glass," SID(2001).

Vangbo et al, "A lateral symmetrically bistable buckled beam," J. Micromech. Microeng., 8:29-32(1998).

Wang et al, "Highly Space-Efficient Electrostatic Zigzag Transmissive Micro-Optic Switches for an Integrated MEMS Optical Display System," Transducers 03 Conference (2003).

Yamada et al, "52.2: Invited Paper:Color Sequential LCD Based on OCB with an LED Backlight," SID 00 Digest, 1180-1183(2000).

Yasumura et al, "Fluid Damping of an Electrostatic Actuator for Optical Switching Applications," Transducers Research Foundation (2002).

LIGHT GUIDES AND BACKLIGHT SYSTEMS INCORPORATING LIGHT REDIRECTORS AT VARYING DENSITIES

CROSS-REFERENCE APPLICATIONS

This application is a continuation application of U.S. application Ser. No. 13,164,469, filed on Jun. 20, 2011, which is a continuation of U.S. application Ser. No. 11/973,187, filed on Oct. 5, 2007, which claims the benefit of U.S. Provisional Patent Application Ser. No. 60/853,409, filed on Oct. 20, 2006; and U.S. Provisional Patent Application Ser. No. 60/930,855, filed on May 18, 2007. The specifications of each of the foregoing are incorporated by reference herein in their entirety.

BACKGROUND OF THE INVENTION

The displays of many portable devices rely on backlights to provide their illumination. Viewers of these displays desire uniform light emission across the surface of a display with as few visual artifacts as possible. As screens become larger, multiple spatially separated light sources are used to illuminate the backlight. Such illumination schemes increase the challenge of providing artifact free, uniform light emission from a display.

SUMMARY OF THE INVENTION

There is a need in the art for a backlight providing improved light emission uniformity, with limited visual artifacts, particularly when multiple, spatially separated light sources are employed to illuminate the backlight. According to one aspect, the invention relates to a light guide of display. The light guide includes a front surface, a rear surface, and at least one edge separating the front and rear surfaces. The light guide includes a first light introduction position on an edge of the light guide through which a light source introduces light into the light guide. The light guide also has a second light introduction position, either on the same or on a different edge, through which a second light source introduces light into the light guide. The first light introduction position is spatially separated from the second light introduction position.

The light guide also includes a plurality of geometric light redirectors, also referred to herein as deflectors. The light redirectors may have triangular, trapezoidal, trapezial, cylindrical, rounded, or other defined geometric cross section. In one implementation, at least some of the light redirectors have dimensions that are smaller than 500 microns. The light redirectors are distributed amongst three regions of either the front or rear surfaces of the light guide. A first region includes light redirectors predominantly, if not solely, from a first group of light redirectors. The second region includes light redirectors predominantly, if not solely from a second group of light redirectors. The third region includes light redirectors from both groups.

Light redirectors in the first group substantially face the first light introduction position. That is, a front face of a light redirector in the first group is substantially perpendicular (e.g., within plus or minus 20 degrees of perpendicular) to a line connecting the light redirector, for example from the center of its front face, to the first light introduction position. Light redirectors in the second group similarly substantially face the second light introduction position. The light redirectors in each group may vary in size, shape, and angle relative to the line connecting the light redirector to its corresponding light introduction position. The light redirectors may increase in height with distance from the corresponding light introduction position.

In one embodiment, the light guide also includes a plurality of light sources. At least one light source is associated with each light introduction position. The light source might be white or colored. A single light source may include multiple colored lamps. The lamps may be, for example, light emitting diodes.

In another aspect, the invention relates to a light guide of a display that includes a plurality of geometric light redirectors that face a light introduction position on an edge of the light guide. The density of the plurality of light redirectors, beginning at a first distance along a direction radially extending from the light introduction position, gradually decreases as the distance increases. In addition, the light redirectors may increase in height with in relation to their respective distances from the light introduction position. The density may decrease substantially continuously or in a step wise fashion. In one implementation, the direction in which the density of the light redirectors gradually decreases is at least partially towards a second light introduction position on an edge of the light guide.

In another aspect, the invention relates to a light guide of a display having a front surface, a rear surface, and first, second, and third edges separating the front and rear surfaces. Distributed across one of the front surface and the rear surface are a plurality of first geometric light redirectors, each having a front face substantially perpendicular to a line connecting the front face to a light introduction position on the first edge, and a plurality of second geometric light redirectors, each having a front face oriented at least partially towards the second edge or third edge. The light redirectors may increase in height with in relation to their respective distances from the light introduction position. Reflective surfaces directed towards an interior of the light guide are positioned proximate the second and third edges and.

BRIEF DESCRIPTION OF THE DRAWINGS

The foregoing discussion will be understood more readily from the following detailed description of the invention with reference to the following drawings.

DESCRIPTION OF CERTAIN ILLUSTRATIVE EMBODIMENTS

To provide an overall understanding of the invention, certain illustrative embodiments will now be described, including backlights and backlight systems for providing illumination for a display. However, it will be understood by one of ordinary skill in the art that the backlights and backlight systems described herein may be adapted and modified as is appropriate for the application being addressed and that the systems and methods described herein may be employed in other suitable applications, and that such other additions and modifications will not depart from the scope hereof.

Figure 1:
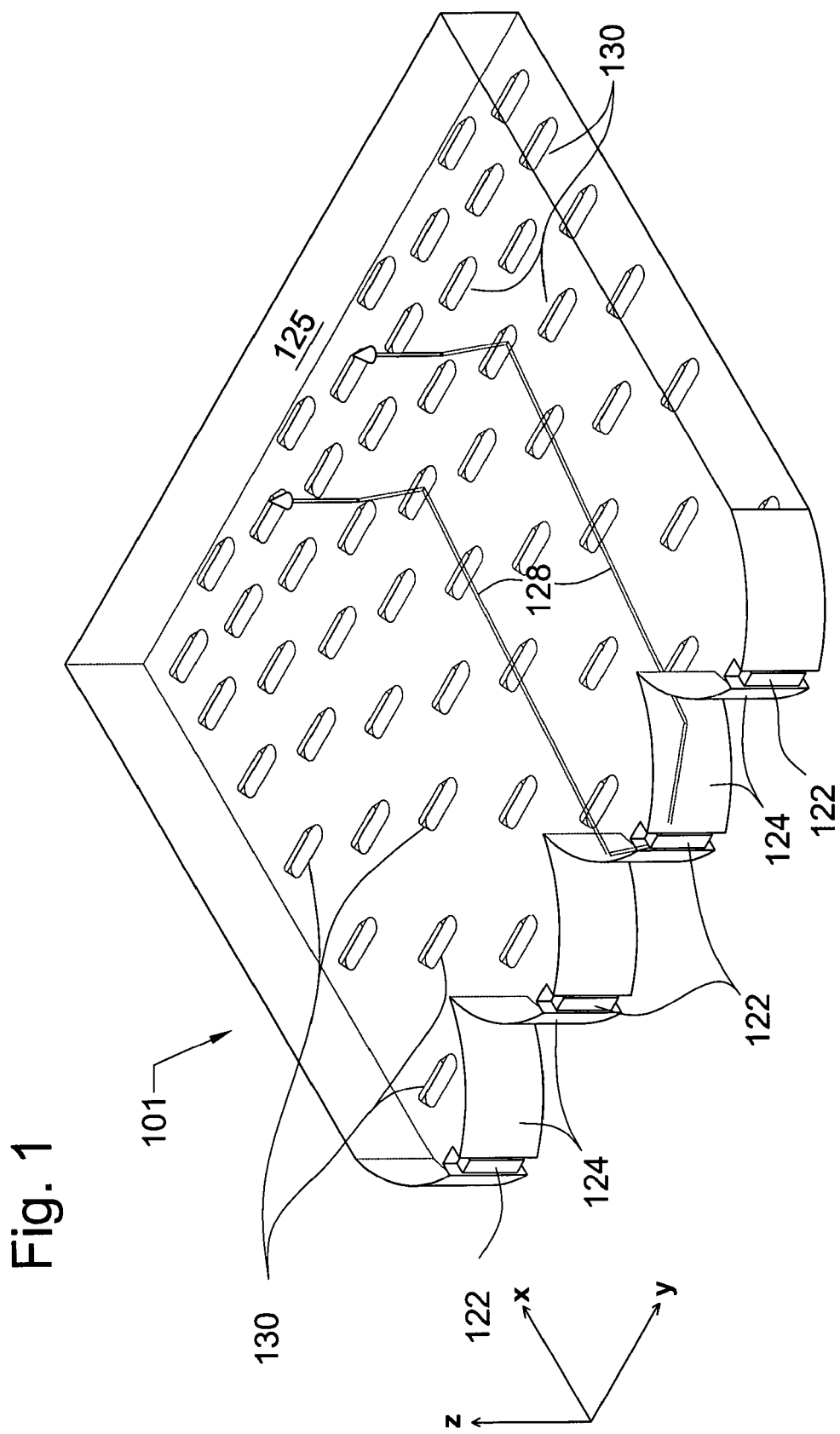
FIG. 1 is a perspective view of a first backlight system, according to an illustrative embodiment of the invention.

FIG. 1 illustrates a backlight system 101 that is useful in conjunction with a number of optical illumination devices, including liquid crystal displays or mechanical light modulator displays and/or architectural lighting devices. The backlight system 101 includes a light guide plate 125, made of a transparent material, that accepts light from a plurality of lamps 122, disposed along one edge of the light guide plate. The backlight system 101 is capable of redirecting light vertically, or in a direction normal to the plane of the light guide plate 125 (i.e. along the z-axis) and toward a spatial light modulator and/or a toward a viewer of the optical device. The spatial light modulator (not shown) can include an array of light modulators or pixels for forming an image from the light emanating out of the backlight system 101.

In addition to the lamps 122, the backlight system 101 includes collimator structures 124. Light rays, such as light rays 128, exiting the lamps 122, are reflected from the sides of the collimators 124 and then enter the light guide 125 substantially collimated with respect to the x-axis. The divergence of the ray's exiting the curved reflectors can be controlled within +/−50 degrees and in some cases into a divergence as narrow as +/−20 degrees.

The light guide 125 includes an array of geometric light redirectors, also referred to as deflectors 130, formed on the bottom surface of light guide 125. The deflectors serve to re-direct light out of its trajectory in the x-y plane and into directions more closely aligned with the normal or z-axis of the backlight. In some cases, where the deflectors 130 are coated with a metal film, the deflectors 130 re-direct light by means of reflection from the metal surface. In light guide 125, however, the deflectors are formed from indentations or protuberances in the molded bottom surface of light guide 125. The light reflections occur by means of partial or total internal reflection at the interface between the plastic light guide 125 and the outside air.

The deflectors 130 are 3-dimensional shapes formed from the indentations in or protuberances from the surface of light guide plate 125. The cross section through the narrow dimension of the deflector 130 is a trapezoid, i.e. each deflector has a flat top that is substantially parallel to the surface of light guide plate 125. The cross section of deflector 130 along the longer axis is also a trapezoid.

All of the deflectors 130 are arranged with their long axes parallel to the y-axis. Each deflector has a front face whose normal lies in the x-z plane. The angle of the front face with respect to the x-axis is chosen to maximize the amount of light, as exemplified by rays 128, that can be extracted from the light guide plate and directed substantially along the z-axis or toward the viewer. The deflector 130 has an aspect ratio in length to width greater than 2:1, in some cases greater than 20:1

The deflectors 130 are arranged with unequal spacing in the light guide 105. The closer spacing (or higher density of deflectors 130) at distances further from the lamps 122 helps to improve the uniformity of the luminous intensity of the light emitted out of the top surface of the light guide. Although FIG. 1 shows the deflectors arranged in rows with more or less regular spacing between deflectors in a row, it is often advantageous to randomize the position or vary the spacings between deflectors 130 in a local area, in order to avoid illumination artifacts in the display. In some embodiments the size and shape of the deflectors 130 is varied as a function of position in the light guide plate 125. In other embodiments a variety of orientation angles is provided for the geometric light redirectors 130. For instance, while on average the deflectors 130 will have the surface normal of their front face lying in the x-z plane, a plurality of deflectors 130 could also be tilted so that their surface normals are directed slightly to the right or to the left of the x-z plane.

While the deflectors 130 in backlight system 101 are formed in the rear surface of light guide 125, other embodiments are possible where the deflectors can be formed in the top surface of the light guide. Alternate shapes for the geometric light redirectors 130 are known in the art including, without limitation, triangular prism structures, hexagonal prism structures, rhombohedral prism structures, curved or domed shapes, including cylindrical structures, as well as triangular prisms that include rounded corners or edges. For each of the these alternate shapes a front face can be identified on the geometric light redirector which possesses a particular orientation with respect to the lamps 122. As opposed to the use of paint dots, which are used in some backlight designs to scatter light into random directions, the front face of a geometric light redirector is designed to scatter light from a lamp into a particular set of directions.

Figure 2:
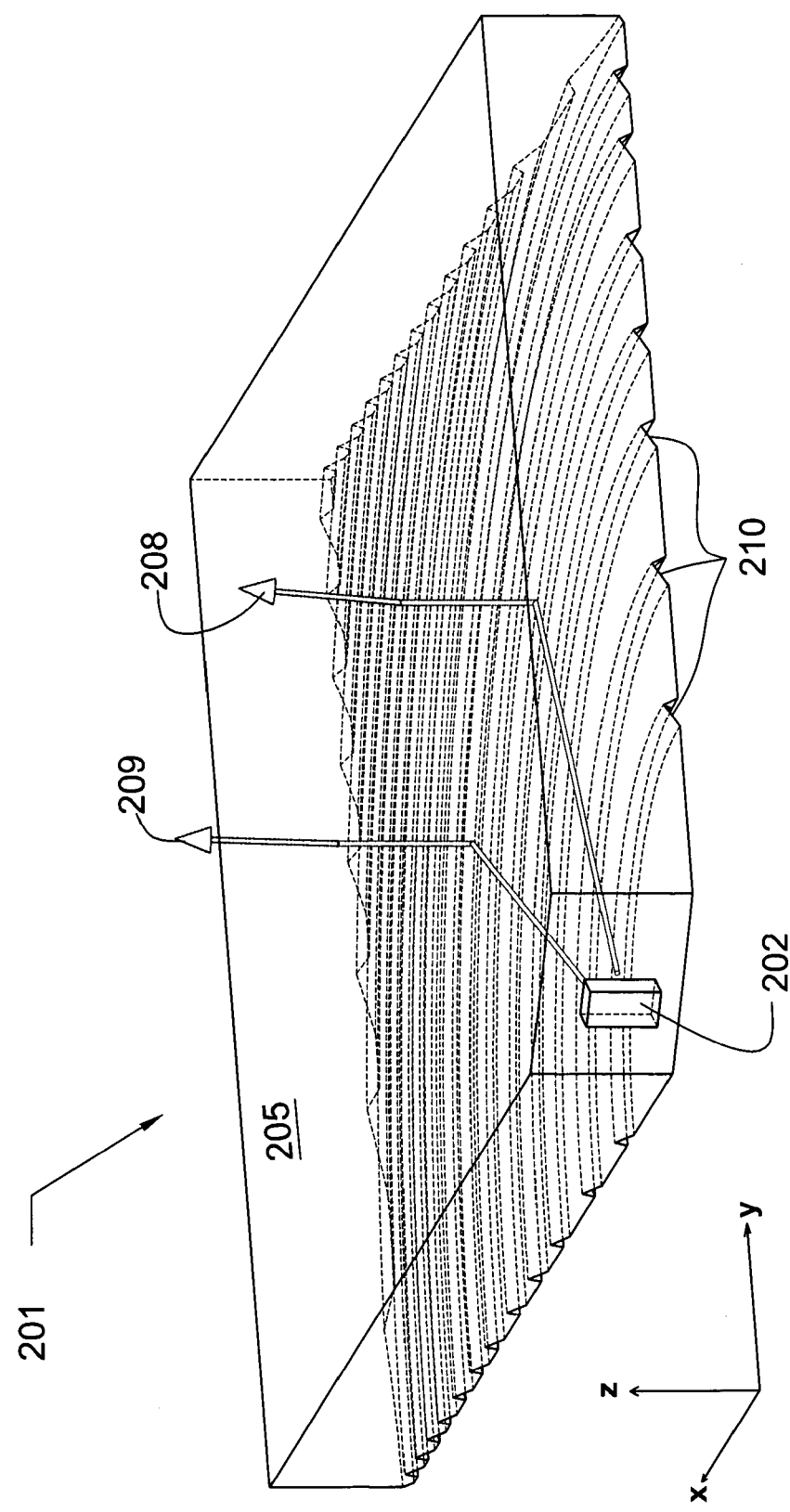
FIG. 2 is a perspective view of a second backlight system, according to an illustrative embodiment of the invention.

The backlight system 201 of FIG. 2 is another example of a backlight for distributing light from a lamp uniformly throughout a planar light guide and re-directing such light toward a viewer. The backlight system 201 includes a plurality of lamps 202, and a light guide plate 205. The light guide 205 includes an array of deflectors 210. The deflectors 210 are long and curved indentations in or protuberances from the bottom surface of light guide plate 205. In cross section, the deflectors 210 are triangular in shape. Optionally, the bottom surface of the light guide plate 205 is coated with or positioned proximate to a reflective metal surface. The deflectors 210 are arranged along the bottom of light guide plate 205 along a series of concentric circles. Light rays such as light rays 208 and 209 exit the lamp 202 in a radial direction within the x-y plane, generally perpendicular to the orientation of the deflector circles 210. After reflection from deflectors 210 the light rays 208 and 209 are re-directed into angles that are closer to the normal or z-axis, i.e. out of the light guide 205, and towards the viewer. The density of placement of deflectors 210, or the spacing between concentric rings, is also varied as a function of distance from the lamp 202 in order to improve the uniformity of the emitted light.

The backlight system 201 is capable of controlling the divergence of light emitted from the top surface of the backlight system 201 to a cone angle of +/−50 degrees, in some cases as narrow as +/−20 degrees. The control of angles is achieved by substantially matching the arrangement of the deflectors 210 to the radiation pattern of the lamps 202. The long axes of deflectors 210 are oriented perpendicular to the rays (or radial vectors) that emanate from the lamps 202. Expressed another way: the normals to the deflecting surfaces from deflectors 210 are contained within a plane that includes the z axis and the radial vectors from lamps 202. Expressed in still another way, the deflecting surfaces of the deflectors 210 intersect the bottom surface of the light guide 205 at lines referred to herein as the "intersection lines." The intersection lines are oriented perpendicular to lines that emanate radially from the lamp 202.

Figure 3:
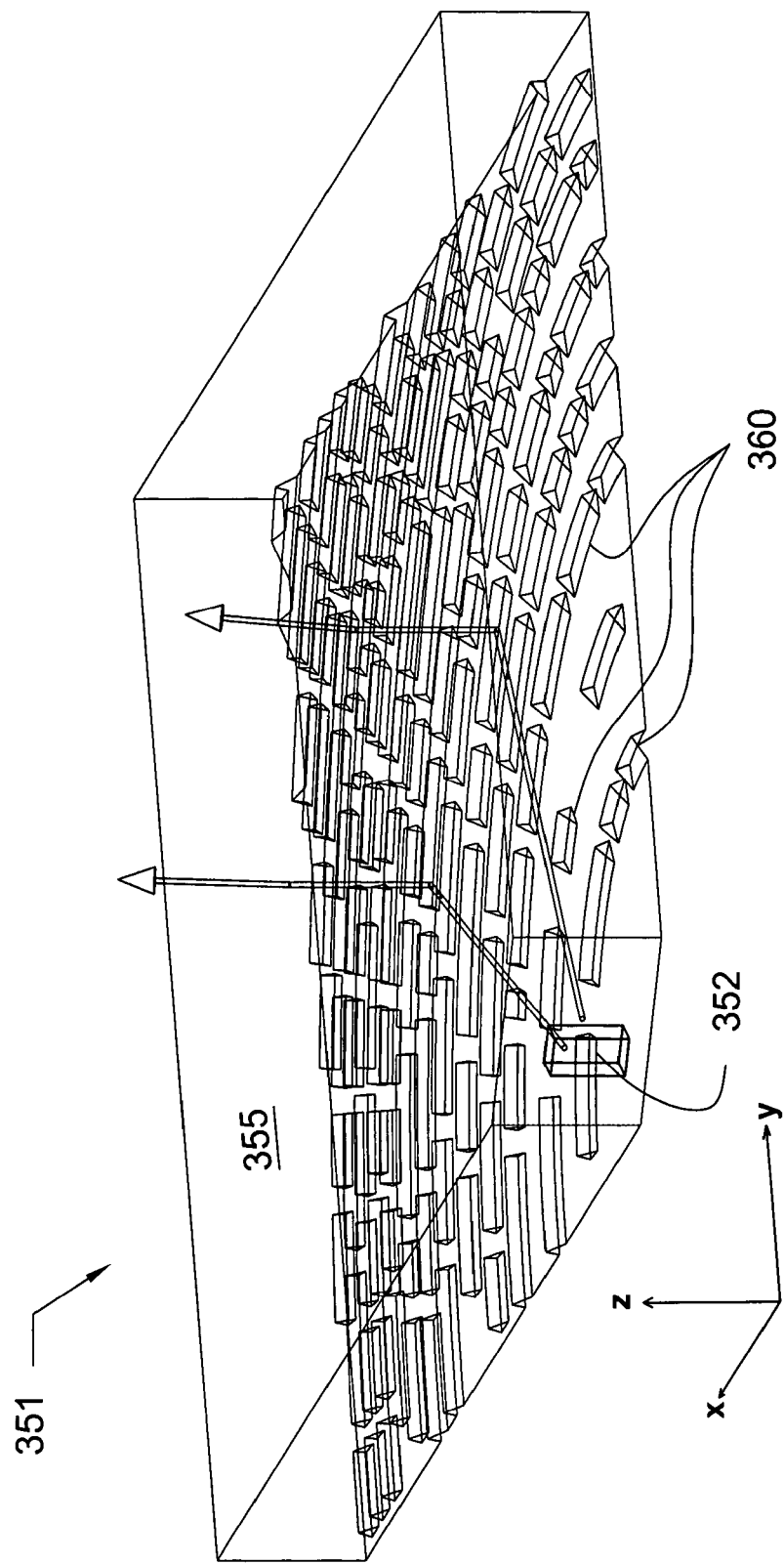
FIG. 3 is a perspective view of a third backlight system, according to an illustrative embodiment of the invention.
Figure 4:
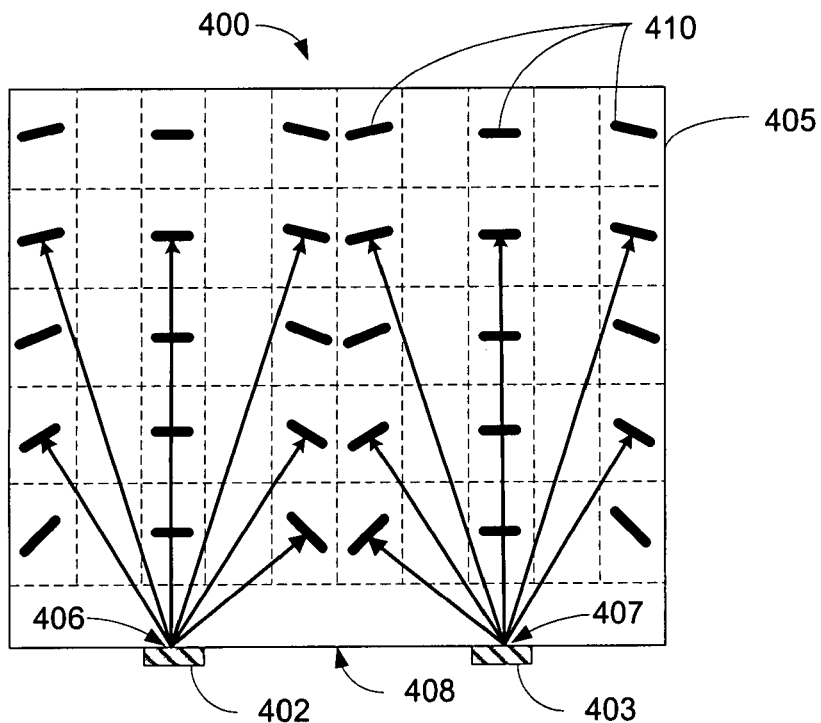
FIG. 4 is a top view of a fourth backlight system, according to an illustrative embodiment of the invention.

The backlight system 351 of FIG. 3 is another example of a backlight for distributing light from a lamp in a substantially uniform fashion throughout a planar light guide and re-directing such light toward a viewer. The backlight system 351 includes lamps 352, a light guide plate 355 and an array of deflectors 360. Optionally, the bottom surface of the light guide plate 355 is coated with or positioned proximate to a reflective metal surface. The deflectors 360 have prismatic shapes similar to deflectors 130, except that the deflectors 360 have a triangular cross section. The segmented or 3-dimensional deflectors 360 are placed along and oriented generally parallel to the circumference of series of circles. The segmented deflectors do not need to be perfectly parallel to the circumferential direction; instead they can have a randomized placement about an average orientation along the circumferential direction. The density of the deflectors 360 varies as a function of distance from the lamps 352. The closer spacing between deflectors 360 at distances further from the lamps 352 helps to ensure the uniformity of the emitted light The backlight system 400 of FIG. 4 is another example of a backlight in which 3-dimensional control of emitted light is established by incorporation of light redirectors arranged in a radial pattern. The backlight system 400 includes two lamps 402 and 403, a light guide plate 405, and a plurality of deflectors 410. Optionally, the bottom surface of the light guide plate 405 is coated with or positioned proximate to a reflective metal surface. The 3-dimensional shape of deflectors 410 is not shown in FIG. 4, but they are understood to possess either a trapezoidal cross section, as in deflectors 130, or a triangular cross section as in deflectors 360, or any of the cross sections for deflectors described within U.S. patent application Ser. No. 11/528,191, described further below and incorporated herein by reference, including, for example, rounded, cylindrical, trapezoidal, or other regular geometric shapes. The long axis of each deflector 410 need not be straight, as shown in FIG. 4, but can also be curved, for instance to match the circumference of a circle centered on one of the lamps 402 or 403.

In U.S. patent application Ser. No. 11/528,191, a display including an array of light modulators, a light guide, and front-facing and rear-facing reflective surfaces was described. The light guide includes a plurality of geometric light redirection centers to extract light from the backlight.

In one embodiment described in U.S. patent application Ser. No. 11/528,191, the light modulators are MEMS-based light modulators, for example, shutters, which selectively interfere with light that passes through corresponding apertures in the rear-facing reflective layer. The array of light modulators defines a display surface. The display plane is preferably substantially planar. The light guide includes a front surface and a rear surface. In one embodiment, between about 50% to about 95% of the area of the rear surface of the light guide is substantially parallel to the display surface. In one particular embodiment, at least 50% of the area of the rear surface of the light guide is substantially parallel to the display surface. In another embodiment, at least 60% of the area of the rear surface of the light guide is substantially parallel to the display surface. In still another embodiment at least 70% of the area of the rear surface of the light guide is substantially parallel to the display surface. In a further embodiment at least 80% of the area of the rear surface of the light guide is substantially parallel to the display surface. In yet another embodiment, at least 80% of the area of the rear surface of the light guide is substantially parallel to the display surface.

The geometric light redirectors are also referred to herein as extraction centers, extraction structures, and deflectors. The light redirectors' function is to extract light out of the light guide and toward the viewer. In one embodiment, the light redirectors are prismatic in shape. Alternatively, the light redirectors are round, curved, trapezoidal, elliptical. The surfaces of the light redirectors are preferably smooth. The light redirectors are capable of extracting light wherein a higher-than-random percentage of light is directed towards the reflective aperture layer within a pre-determined range of angles.

In some embodiments, as described in U.S. patent application Ser. No. 11/528,191, the light directors have a front surface facing a lamp and a rear surface facing away from the lamp. The area of the footprint of the front face of a redirector onto the front-facing reflective surface may be greater than the area of a similar footprint of the rear face of the redirector. Alternatively, the areas of the footprints of the front and rear surfaces of the light redirectors are equal. In addition, the packing density of the light redirectors in the light guide may vary as a function of the light redirectors' distance from the lamp.

The rear-facing reflective layer (also referred to as the reflective aperture layer), as described in U.S. patent application Ser. No. 11/528,191, includes a plurality of apertures and is positioned in front of the light guide, i.e., between the light guide and an intended viewer. The rear-facing reflective layer is preferably positioned behind the light modulators. In one embodiment, the rear-facing reflective layer is formed from the deposition of a metal on the front surface of the light guide. The rear-facing reflective layer may also be formed from a dielectric mirror or from a thin film stack that includes both dielectric and metal layers. The rear-facing reflective layer preferably reflects light specularly with a reflectivity in the range of 90 to 98%.

The front-facing reflective layer, in one embodiment (also referred to herein as a back-reflector or back-reflective surface), as described in U.S. patent application Ser. No. 11/528,191, is substantially parallel to the display surface. That is, it is preferably at an angle of less than about 10 degrees to the display surface. In one embodiment, the front-facing reflective layer is parallel to the display surface. In one implementation, the front-facing reflective layer is a metal deposited on the rear surface of the light guide. The front-facing reflective layer may also be formed from a dielectric mirror or from a thin film stack that includes both dielectric and metal layers. Alternatively, the front-facing reflective layer is separated from the light guide by an air gap. The front-facing reflective layer, in one embodiment reflects light specularly. It preferably has a reflectivity in the range of 90 to 98%.

Such displays concentrate emitted light within a range of angles about an axis normal to the display plane (referred to as the "display normal"). For example, light can be concentrated such that a higher-than-random percentage of light reflected off of the rear-facing reflective surface towards the front-facing reflective layer at angles within a useful range of angles about the display normal is redirected towards the reflective aperture layer at angles also within the range of useful angles about the display normal. The range of useful angles, in various embodiments ranges from about 20 degrees to about 40 degrees from the display normal. For example, in one embodiment, the useful range of angles includes angles within 20 degrees of the display normal. In another embodiment, the useful range of angles includes angles within 30 degrees of the display normal. In still a further embodiment, the useful range of angles includes angles within 40 degrees of the display normal.

In one embodiment, at least 50% of the light reflected off the rear-facing reflective layer at an angle within the useful range of angles exits the light guide at an angle also within the useful range of angles. In another embodiment, at least 70% of the light reflected off the rear-facing reflective layer at an angle within the useful range of angles exits the light guide at an angle also within the useful range of angles. In a further embodiment, at least 90% of the light reflected off the rear-facing reflective layer at an angle within the useful range of angles exits the light guide at an angle also within the useful range of angles.

As described in U.S. patent application Ser. No. 11/528,191, this ability to redirect light received at a useful angle back at a useful angle is referred to herein as conical reflectance. More particularly, conical reflectance is defined as the ability of a backlight or illumination system to receive an incoming cone of light within a pre-determined range of angles (measured with respect to an incident axis) and then re-emit or reflect that light along an equivalent exit axis where the integrated intensity (or radiant power) of the exit light, measured about the exit axis over the same pre-determined range of angles, is greater than a specified fraction of the integrated incident light. The incoming cone of light preferably illuminates an area of the backlight at least 2 mm in diameter and the radiant power is preferably determined by integrating reflected light over a similar or larger area.

Each of the deflectors 410 possess a front face at least partially directed toward one of two positions (referred to as a "light introduction position") 406 and 407 on the edge 408 of the light guide plate 405 through which one of the lamps 402 or 403 introduces light into light guide plate 405. The normal to the front face of a deflector 410 lies in a plane that contains both the normal to the top surface of the light guide and a line substantially connecting the center of the front face of the deflector to one of the light introduction positions 406 or 407. Similarly, the front faces of the deflectors 410 intersect the bottom surface of the light guide at a line referred to herein as the "intersection line". Each deflector 410 is oriented such that its intersection line is substantially perpendicular to a line connecting the midpoint of the intersection line to a corresponding light introduction position 406 or 407. The deflectors 410 possess both a long axis and a short axis. The long axis is oriented in a direction substantially parallel to the intersection line. In other words, similar to backlight system 351, the deflectors are generally arranged along the circumference of circles which are centered on one or the other of the lamps 402 and 403.

Two groups or distinct populations of deflectors 410, A and B, can be identified within the backlight system 400. One population of deflectors, A—on the left side of backlight 400, is oriented so that their front faces are at least partially directed toward the lamp 402 and the corresponding light introduction position 406 on the edge 408 of the light guide plate 405. The other population of deflectors, B—on the right side of backlight 400, is oriented so that their front faces are at least partially directed toward the lamp 403 and the corresponding light introduction position 407 on the edge 408 of the light guide plate 405.

Both populations of deflectors, A and B, include deflectors 410 with differences in size, shape, orientation, and/or spacing. In some cases the variations within a population are systematic by design. For instance in some embodiments the deflectors 410 are intentionally made taller or wider as the distance increases between the deflectors 410 and the lamp 402 or 403 toward which they are directed. In other embodiments the density of deflectors 410 is increased (i.e., the spacing between deflectors is decreased) as the distance increases between the deflectors 410 and the lamp 402 or 403 toward which they are directed.

In other cases an irregular or random variation in deflector 410 shape or orientation is provided within each of the deflector 410 populations A and B. For instance the faces of the deflectors 410 in population A may be distributed within a range of angles, with respect to lamp 402 and light introduction position 406 where only a median face angle is directed substantially toward the lamp 402 and light introduction position 406. The deflectors 410 within population A have a distribution of face angles that are somewhat greater than or less than the median angle, for instance within a range that is plus or minus 10 degrees or plus or minus 20 degrees. The positions of the deflectors 410 can also be randomized, within the constraints of a given local average deflector 410 density, so as to avoid any fixed or repetitive patterns which might detract from the image quality of the display.

Figure 5:
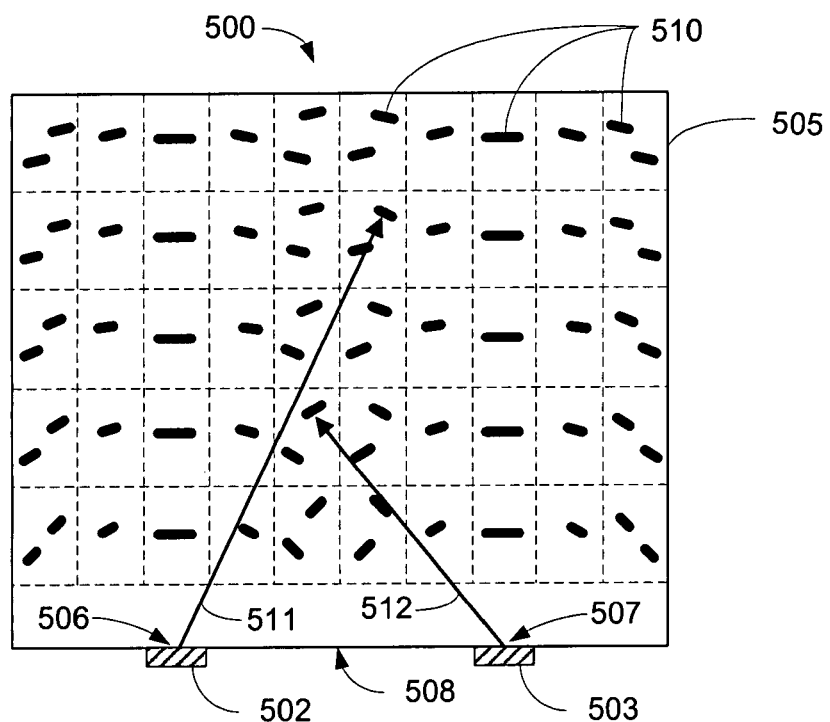
FIG. 5 is a top view of a fifth backlight system, according to an illustrative embodiment of the invention.

The backlight system 500 of FIG. 5 is another example of a backlight in which 3-dimensional control of emitted light is established by incorporation of light redirectors arranged in radial patterns. The backlight system 500 includes two lamps 502 and 503, a light guide plate 505, and a plurality of deflectors 510. Optionally, the bottom surface of the light guide plate 505 is coated with or positioned proximate to a reflective metal surface. The deflectors 510 may have trapezoidal cross sections, triangular cross sections, or any of the deflector cross sections described above.

Each of the deflectors 510 possess a front face substantially directed toward one of two positions (referred to as a "light introduction position") 506 and 507 on the edge 508 of the light guide plate 505 through which one of the lamps 502 or 503 introduces light into light guide plate 505. The normal to the front face of a deflector 510 lies in a plane that contains both the normal to the top surface of the light guide plate 505 and a line substantially connecting the center of the front face of the deflector to one of the lamps 502 or 503 or its corresponding light introduction position 506 or 507 on the edge of the light guide plate 505. The deflectors 510 possess both a long axis and a short axis. The deflectors are arranged such that the long axis is substantially perpendicular to a ray of light emanating from one of either lamp 502 or 503, entering the light guide plate at one of the light introduction positions 506 or 507, and impinging on the reflector at about the midpoint of its long axis. Similar to backlight system 351, the deflectors are generally arranged along the circumference of circles which are centered on one or the other of the lamps 502 and 503.

Two groups or distinct populations of deflectors 510, A and B, can be identified within the backlight system 500. One population, A, of deflectors is oriented so that their front faces are directed substantially toward the lamp 502 and the corresponding light introduction position 506 on the edge of the light guide plate 505. For example, the deflector shown at the terminus of light ray 511 belongs to population A. The other population of deflectors 510, B, is oriented so that their front faces are directed substantially toward the lamp 503 and the corresponding light introduction position 507. For example, the deflector shown at the terminus of light ray 512 belongs to population B. By contrast to backlight 400, however, the deflector populations A and B in backlight 500 are not strictly grouped or segregated by location into one of either the left side or right side of the backlight. Instead the populations A and B are intermixed. Most but not all of the deflectors 510 in population A are located on the side of the backlight nearest to the light introduction position 506. Most, but not all of population B are located on the side of the backlight nearest to the light introduction position 507. In the central region of the backlight referred to as a mingling region, deflectors can be found oriented toward either of the lamps 502 or 503 and their corresponding light introduction positions 506 and 507. That is, the mingling region includes deflectors 510 from each of the populations A and B.

The populations of deflectors 510, A and B, can include deflectors 510 having differences in size, shape, orientation, or spacing. As described above, some of these variations can be systematic, as when the size of a deflector 510 varies as a function of its position relative to an associated lamp or light introduction position. Alternatively, the variations can be irregular, as when the face angles or the density of deflectors 510 in a population is allowed to be distributed about some mean value.

Figure 6A:
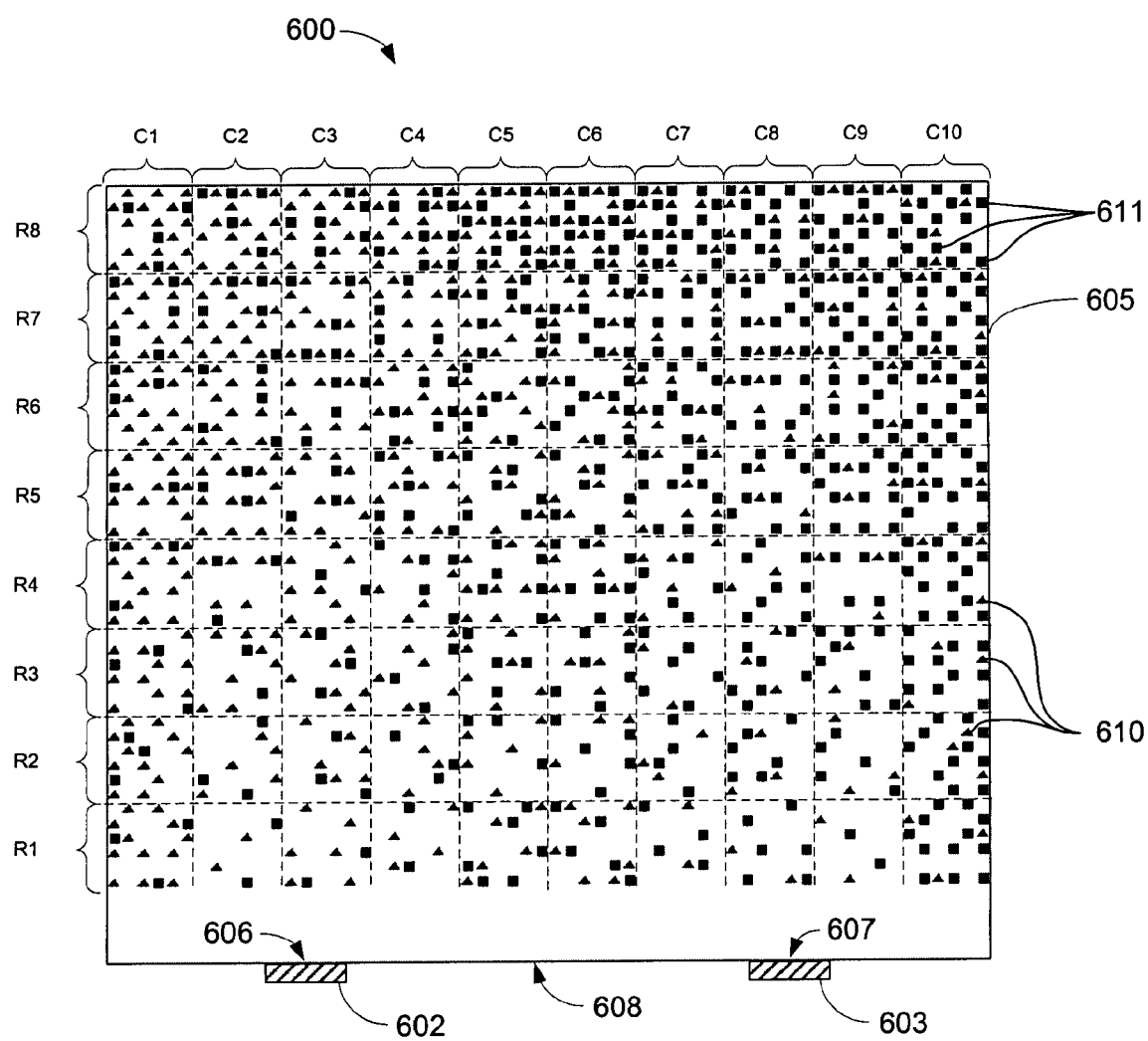
FIG. 6A is a top view of a sixth backlight system, according to an illustrative embodiment of the invention.

The backlight system 600 of FIG. 6A is another example of a backlight in which 3-dimensional control of emitted light is established by means of radial deflector patterns. The backlight system 600 includes two lamps 602 and 603, a light guide plate 605, and a plurality of deflectors 610 and 611. For purposes of illustration, the shapes of the deflectors are not shown in FIG. 6A. Instead, the positions of the deflectors 610 are indicated by triangles, and the position of deflectors 611 are indicated by squares. FIG. 6A thus illustrates the relative position and density of each group of deflectors 610 and 611 across the surface of the light guide plate 605. Optionally, the bottom surface of the light guide plate 605 is coated with or positioned proximate to a reflective metal surface.

The deflectors 610 can have trapezoidal cross sections, triangular cross sections, or any of the deflector cross sections described above. As in backlight system 400 and 500, each of the deflectors 610 and 611 possess a front face at least partially directed toward one of the lamps 602 or 603 or to a corresponding position 606 or 607 (referred to a light introduction position) on an edge 608 of the light guide plate 605. The normal to the front face of a deflector 610 or 611 lies in a plane that contains both the normal to the top surface of the light guide and a line substantially connecting the deflector to one of the lamps 602 or 603 or their corresponding light introduction positions 606 or 607 on the edge 608 of the light guide plate 605. Similarly, the front faces of the deflectors 610 and 611 intersect the bottom surface of the light guide at a line referred to herein as the "intersection line". Each deflector 610 and 611 is oriented such that its intersection line is substantially perpendicular to a line connecting the midpoint of the intersection line to a corresponding light introduction position 406 or 407.

The deflectors 610 and 611 possess both a long axis and a short axis. The deflectors 610 and 611 are arranged such that their long axis is substantially perpendicular to a ray of light emanating from one of either lamp 602 or 603, entering the light guide plate 605 at a corresponding light introduction position 606 or 607, and impinging on the deflector 610 at about the center of its front face. Similar to backlight system 300, the long axis of deflectors 610 and 611 are generally arranged along the circumference of circles which are centered on one or the other of the lamps 602 and 603.

Two groups or distinct populations of deflectors, A and B, exist within the backlight system 600. The two groups are distinguished by the square and triangle symbols. One population, A, made up of deflectors 610, is oriented so that their front faces are directed substantially toward the lamp 602 or to its corresponding light introduction position 606 on the edge 608 of the light guide plate 605. The other population of deflectors, B, made up of deflectors 611, shown by the square symbols, is oriented so that their front faces are substantially directed toward the lamp 603 or its corresponding light introduction position 607 on the edge 608 of the light guide plate 605. The populations A and B are intermixed.

To illustrate the distribution of deflectors in backlight 600, the backlight has been divided into 80 sections, labeled by rows (R1, R2, etc.) and columns (C1, C2, etc.). The deflectors 610 and 611 in the section labeled R1,C3 are situated in proximity to lamp 602. For the most part only deflectors 610 from population A exist within section R1,C3, and their density is relatively low.

The section labeled R4,C1 is similarly populated primarily by deflectors 610 from population A, but the density of deflectors 610 in section R4,C1 is substantially higher than those found in section R1,C3.

The total density of deflectors 610 and 611 in section R4,C6 is similar to that found in section R4,C2; however, the section R4,C2 is populated by deflectors from each of the populations A and B. Approximately equal numbers of deflectors from each of the populations 610 and 611 can be found within the section R4,C2

The total density of deflectors in section R4,C9 is similar to that in section R4,C10. In this case the section is populated primarily by deflectors 611 of population B, associated with lamp 603.

Each of the sections along row R8 has a total density of deflectors that is higher than the total density of deflectors in row R4. However each of the sections along row R8 includes a mingling of deflectors 610 and 611 from each of the populations A and B. In section R8,C1 a greater fraction of the deflectors is assigned to deflectors 610 of population A. In section R8,C10 a greater fraction is assigned to deflectors 611 or population B. And in section R8,C6 the deflectors are about equally divided between the populations A and B.

Figure 6B:
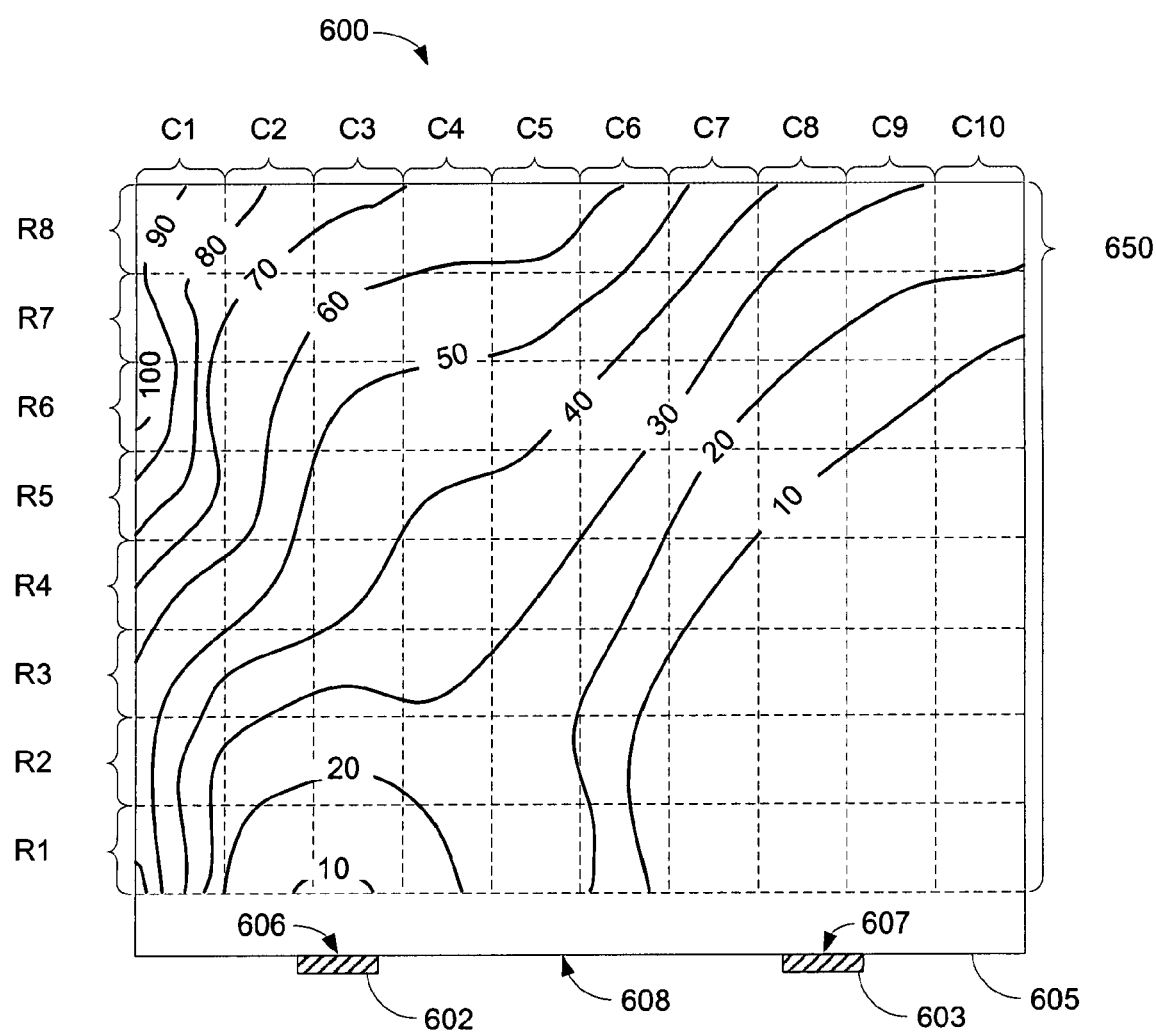
FIG. 6B is a density contour map indicating the density of one of two populations of light redirectors in the sixth backlight system, according to an illustrative embodiment of the invention.

FIG. 6B presents a density contour map 650, which illustrates the spatial distribution throughout light guide plate 605 of deflectors 610, i.e., deflectors from population A, of the backlight 600. The values associated with each contour are proportional to the number of population A deflectors per square millimeter within the contour. For instance, in one embodiment, the contour marked 10 corresponds to a density of 100 deflectors from population A per square millimeter while the contour marked 100 corresponds to density of 1000 deflectors per square millimeter. As shown in the density map 650, the highest density of deflectors 610 is found in the upper left hand corner, while the lowest density of deflectors 610 is found both immediately in front of the lamp 602 and in the lower right hand corner. For the most part, as one follows directional lines that emanate radially from the lamp 602 or its corresponding light introduction position 606, the density of deflectors 610 increases as the distance from the lamp 602 or light introduction position 606 increases. However for radial lines that pass into the right hand portion of the light guide plate 605 where the light intensity becomes dominated by light radiated from lamp 603, the density of deflectors in population A reaches a maximum value and then gradually or continuously decreases with distance from the lamp 602.

The density contour map 650 illustrates only the distribution of deflectors from population A of the backlight 600. A similar set of density contours exists, but is not shown, for the deflectors from population B. The density of deflectors from population B is highest near the upper right hand corner of the light guide plate 605.

In another embodiment the variation in density may not be proportionally as large as the variation from 10 to 100 as shown in FIG. 6B. Instead the deflector size may change continuously along with the density as a function of position within light guide. For instance the deflectors might be only 20 microns long in the region closest to the lamps 602 and 603 while at distances far away from the lamps the deflectors might be as long as 200 microns.

The backlight systems 400, 500, and 600 are examples of backlights that comprise 2 lamps spaced apart from one another. It will be understood that each of the lamps 402, 502, or 602 can in fact represent a plurality of lamps in a single package that occupy substantially the same position within the backlight. For instance a combination of red, green, and blue semiconducting light emitting diodes (LEDs) can be combined with or substituted for a white LED in a small chip, or assembled into a small multi-chip package. Similarly a lamp can represent an assembly of 4 or more color LEDs, for instance a combination of red, yellow, green, and blue LEDs. Other lamps that are useful for this invention include incandescent lamps, lasers, or field emission light sources.

In addition, in alternative embodiments backlight systems designed according to the principles described herein can include 3, 4, 5 or more lamps all spaced apart from one another. In some embodiments these lamps will be disposed along a single side of the light guide plate, In other embodiments these lamps will be disposed along two opposing sides of the light guide plate. Consistent with the descriptions of backlights 400 and 500, it will be advantageous to produce light guide plates that include multiple distinct populations of deflectors, often as many deflector populations as there are lamps. The deflectors within each population will have a front face which is substantially directed toward its associated lamp. Distinct deflector populations can be intermingled in specific regions of the light guide plate. For instance, in a backlight comprising four lamps, all spaced apart from one another, it is possible to find a region of the light guide plate where representatives of all four distinct populations coexist.

Figure 7:
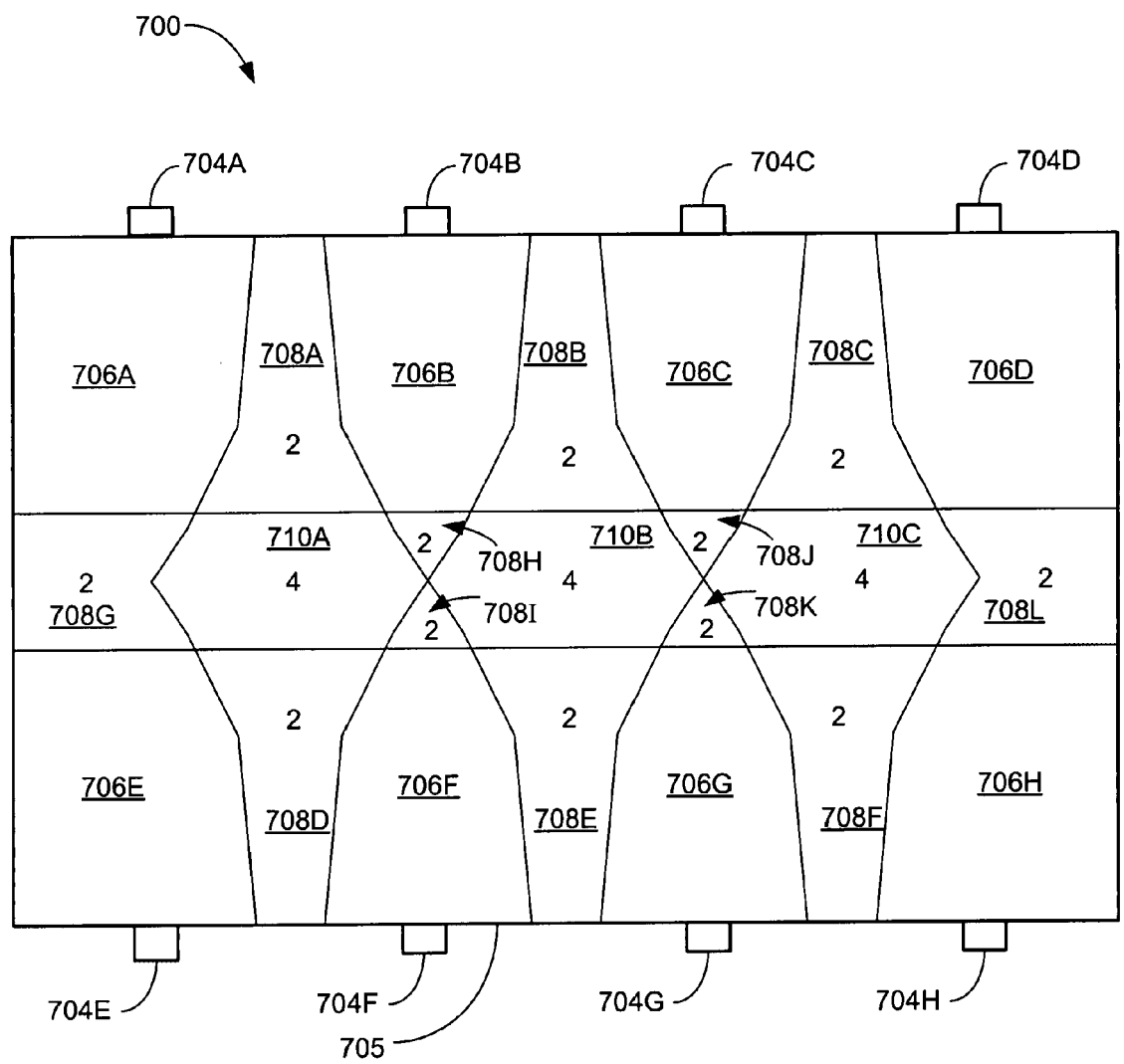
FIG. 7 is a top view of a sixth backlight system, according to an illustrative embodiment of the invention.

FIG. 7 is an illustrative embodiment of a back light system 700 including a light guide plate 705 and eight lamps 704a-704h (generally "lamps 704"). Lamps 704a-704d are positioned adjacent a first edge or side of the light guide plate 705 proximate to respective light introduction positions on the first edge. Lamps 704e-704h are positioned adjacent a second, opposing edge or side of the light guide plate 705 proximate to their own corresponding light introduction positions on the second edge. In alternative implementations, lamps may also be positioned adjacent the other two edges of the light guide plate 705, as well. Optionally, the bottom surface of the light guide plate 705 is coated with or positioned proximate to a reflective metal surface.

The light guide plate 705 includes groups or populations of light redirectors or deflectors (not shown), such as those described above, that correspond to each lamp 704. A deflector is considered to correspond to a particular lamp 704 if its front face is oriented substantially perpendicular, e.g., with plus or minus 20 degrees of perpendicular, to a line connecting the center of the front face of the deflector to a particular lamp 704 or its corresponding light introduction position on the edge of the light guide plate 705.

The various groups of deflectors are arranged on either the front or rear surface of the light guide plate 705 differently in different regions of the light guide plate 705. Some regions, referred to as single deflector regions 706a-706h, include only from one group or population. Single deflector regions 706a, for example, includes only deflectors directed towards lamp 704a. Single deflector regions 706b includes only deflectors directed towards lamp 704b.

Other regions, referred to as dual deflector mingling zones 708a-708k, include deflectors from two of the groups or populations. For example, dual deflector mingling zone 708a includes deflectors directed towards lamps 704a and 704b. Dual deflector mingling zone 708g includes deflectors directed towards lamps 704 and 704e. Dual deflector mingling zone 708h includes deflectors directed towards lamps 704b and 704f.

Quad deflector mingling regions 710a-710c include deflectors from four groups or populations. For example, Quad deflector mingling regions 710a includes deflectors directed towards lamps 704a, 704b, 704e, and 704f.

As with the deflectors described in relation to FIG. 6, the density of each group of deflectors varies to improve the uniformity of light emitted from the light guide plate 705. For example, in one implementation, the density of a particular group of deflectors in a particular region increases in relation to distance form a lamp or light introduction position. Then, upon entering a new region, the density of deflectors in that group decreases while the density of another group of deflectors increases. Preferably, the changes in density are gradual, that is either continually changing or changing in a step-wise fashion.

Figure 8:
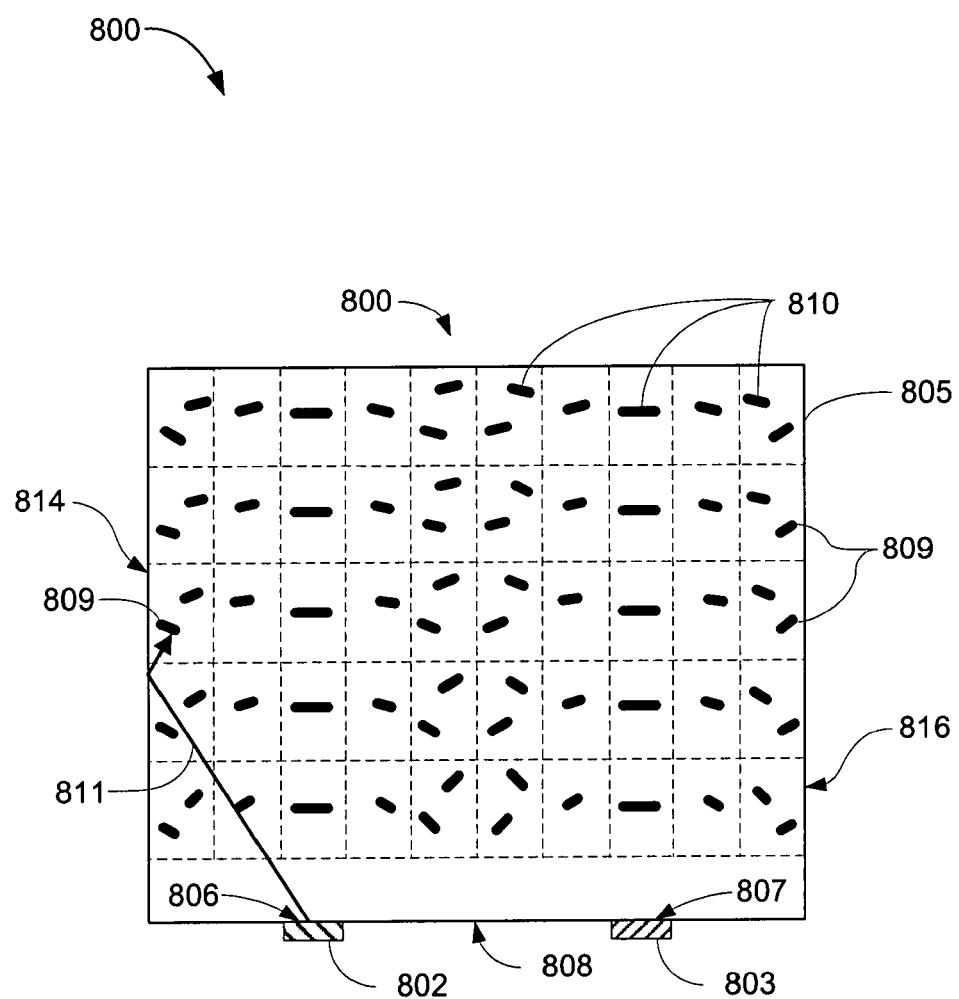
FIG. 8 is a top view of a seventh backlight system, according to an illustrative embodiment of the invention.

The backlight system 800 of FIG. 8 is another example of a backlight in which 3-dimensional control of emitted light is established by incorporation of light redirectors arranged in radial patterns. The backlight system 800 includes two lamps 802 and 803, a light guide plate 805, and two types of deflectors 809 and 810. Optionally, the bottom surface of the light guide plate 805 is coated with or positioned proximate to a reflective metal surface. The deflectors 809 and 810 may have trapezoidal cross sections, triangular cross sections, or any of the deflector cross sections described above.

Each of the deflectors 810 possess a front face substantially directed toward one of two positions (referred to as a "light introduction position") 806 and 807 on the edge 808 of the light guide plate 805 and through which one of the lamps 802 or 803 introduces light into light guide plate 805. Similar to backlight system 381, the deflectors 810 are generally arranged along the circumference of circles which are centered on one or the other of the lamps 802 and 803.

The backlight 800 also comprises two edges 814 and 816 which are distinct from the edge 808. Each of these edges is associated with a reflective surface that is capable of redirecting light back into the light guide 805, which might otherwise escape from the light guide. In one case, this reflection is accomplished by means of total internal reflection from the surfaces 814 and 816. In an alternate embodiment, a reflective thin film or reflective tape is adhered to the edges 814 and 816. In an alternate embodiment, reflection of light at the edges can be accomplished by a white paint material which is applied along the edges 814 and 816. In another embodiment, the backlight 800 is accompanied by a metal enclosure with reflective surfaces, such that light escaping from the surfaces 814 and 816 can be returned to the light guide. In another embodiment, the light guide is held in place by a spacer or retaining structure (not shown). The spacer or retaining structure can include either white or reflective materials such that light escaping from the surfaces 814 and 816 can be returned to the light guide.

In contrast to the deflectors 810, each of the deflectors 809 is directed toward an edge 814 or 816 of the light guide plate 805. In particular, each of the deflectors is oriented such that they intercept light from one of the lamps 802 or 803 after it has been reflected from one of the side edges 814 or 816 of light guide plate 805. An exemplary reflected ray is shown as ray 811.

The two populations of deflectors 809 and 810 can include deflectors having differences in size, shape, orientation, or spacing. As described above, some of these variations can be systematic, as when the size of a deflector 809 or 810 varies as a function of its position relative to an associated lamp or light introduction position. Alternatively, the variations can be irregular, as when the face angles or the density of deflectors 809 or 810 in a population is allowed to be distributed about some mean value.

In an alternate embodiment, the deflectors 810 are not oriented radially with respect to the light introduction positions 806 and 807. Instead the backlight can include a larger number of lamps positioned along the edge 808, similar to the arrangement shown for backlight system 101. As with deflectors 130 in backlight 101, the deflectors 810 can be arranged along lines that are parallel to the edge 808 of light guide 805. In some embodiments, a single linear light source, such as a fluorescent lamp, can be positioned along the edge 808, and the deflectors 810 would then be oriented so that their faces are substantially perpendicular to the edge 808. In each of these embodiments, however, it is advantageous to include a second type of deflector, such as deflectors 809, which are not oriented toward the light introduction edge 808 of the light guide, but rather toward one of the other edges of the light guide so as to intercept reflections from those other edges.

In various implementations of the embodiments depicted and described above, in addition to the features already described, the height of the light redirectors may increase in relation to the distance from a corresponding light introduction position or lamp.

The invention may be embodied in other specific forms without departing from the spirit or essential characteristics thereof. The forgoing embodiments are therefore to be considered in all respects illustrative, rather than limiting of the invention.

What is claimed is:

1. A light guide comprising:
    a front surface, a rear surface, and at least one edge separating the front and rear surfaces;
    a first light introduction position on one of the at least one edge;
    a second light introduction position on at least one edge and spaced away from the first light introduction position;
    a plurality of geometric light redirectors formed therein on one of the front surface and the rear surface of the light guide, wherein:
    a front face of each geometric light redirector intersects with the one of the front surface and the rear surface along an intersection line;
    the plurality of geometric light redirectors are configured to redirect light from at least one of the first and second light introduction positions toward the front surface;
    the plurality of geometric light redirectors include a first group of geometric light redirectors, the intersection line of each geometric light redirector of the first group of light redirectors being substantially perpendicular to a line connecting a midpoint of the intersection line with the first light introduction position;
    the plurality of geometric light redirectors include a second group of geometric light redirectors, the intersection line of each geometric light redirector of the second group of light redirectors being substantially perpendicular to a line connecting a midpoint of the intersection line with the second light introduction position; and
    a first region of the light guide wherein the geometric light redirectors associated with the first group and the geometric light redirectors associated with the second group are intermixed such that a line connecting a midpoint of the intersection line of at least one geometric light redirector of the first group with the first light introduction position intersects a line connecting a midpoint of the intersection line of at least one geometric light redirector of the second group with the second light introduction position.

2. The light guide of claim 1 comprising a second region including only geometric light redirectors of the first group.

3. The light guide of claim 2, comprising a third region including only geometric light redirectors of the second group.

4. The light guide of claim 1, wherein the plurality of light redirectors have one of a triangular cross section and a trapezoidal cross section.

5. The light guide of claim 1, wherein the intersection line of at least one light redirector is curved.

6. The light guide of claim 1, wherein the geometric light redirectors in at least one of the first and second groups have varying shapes.

7. The light guide of claim 1, wherein the geometric light redirectors in at least one of the first and second groups have varying dimensions.

8. The light guide of claim 1, comprising a first light source positioned adjacent the first light introduction position.

9. The light guide of claim 8, comprising a second light source positioned adjacent to the second light introduction position.

10. The light guide of claim 1, comprising a front-facing reflective layer positioned proximate to the rear surface of the light guide.

11. The light guide of claim 10, further comprising a rear-facing reflective layer positioned proximate to the front surface of the light guide arranged to reflect light toward the light guide.

12. The light guide of claim 1, comprising multi-colored light emitting diode modules positioned adjacent to at least one of the first and second light introduction positions.

13. The light guide of claim 1, wherein the density of the geometric light redirectors increases as a distance from at least one of the first and second light introduction positions increases.

14. The light guide of claim 1, wherein the density of the geometric light redirectors decreases as a distance from at least one of the first and second light introduction positions increases.

15. The light guide of claim 1, wherein the height of the geometric light redirectors in at least one of the first and second groups increases as the distance from at least one of the first and second light introduction positions increases.

16. The light guide of claim 1, comprising a side-facing reflective layer positioned proximate to a side of the light guide.

17. The light guide of claim 1, wherein the plurality of geometric light redirectors comprise prismatic light redirectors.

18. A method for manufacturing a light guide comprising:
    providing the light guide, the light guide including a front surface, a rear surface, and at least one edge separating the front and rear surfaces;
    forming a first light introduction position on one of the at least one edge;
    forming a second light introduction position on at least one edge and spaced away from the first light introduction position; and
    forming a plurality of geometric light redirectors on one of the front surface and the rear surface within the light guide, wherein:
    a front face of each geometric light redirector intersects with the one of the front surface and the rear surface along an intersection line;
    the plurality of geometric light redirectors are arranged to redirect light from at least one of the first and second light introduction positions toward the front surface;

the plurality of geometric light redirectors include a first group of geometric light redirectors, the intersection line of each geometric light redirector of the first group of light redirectors being substantially perpendicular to a line connecting a midpoint of the intersection line with the first light introduction position;

the plurality of geometric light redirectors include a second group of geometric light redirectors, the intersection line of each geometric light redirector of the second group of light redirectors being substantially perpendicular to a line connecting a midpoint of the intersection line with the second light introduction position; and forming a first region within the light guide wherein the geometric light redirectors associated with the first group and the geometric light redirectors associated with the second group are intermixed such that a line connecting a midpoint of the intersection line of at least one geometric light redirector of the first group with the first light introduction position intersects a line connecting a midpoint of the intersection line of at least one geometric light redirector of the second group with the second light introduction position.

19. The method of claim 18, comprising positioning a first light source adjacent the first light introduction position and a second light source adjacent to the second light introduction position.

20. The method of claim 19, wherein at least one of the first light source and second light source includes a multi-colored light emitting diode module.

* * * * *